US010060472B2

(12) United States Patent
Ishibashi

(10) Patent No.: US 10,060,472 B2
(45) Date of Patent: Aug. 28, 2018

(54) BEARING DEVICE AND METHOD FOR MANUFACTURING BEARING DEVICE

(71) Applicant: NSK LTD., Tokyo (JP)

(72) Inventor: Yutaka Ishibashi, Fujisawa (JP)

(73) Assignee: NSK LTD., Tokyo (JP)

( * ) Notice: Subject to any disclaimer, the term of this patent is extended or adjusted under 35 U.S.C. 154(b) by 28 days.

(21) Appl. No.: 15/318,053

(22) PCT Filed: Jun. 11, 2015

(86) PCT No.: PCT/JP2015/066951
§ 371 (c)(1),
(2) Date: Dec. 12, 2016

(87) PCT Pub. No.: WO2015/190580
PCT Pub. Date: Dec. 17, 2015

(65) Prior Publication Data
US 2017/0114829 A1    Apr. 27, 2017

(30) Foreign Application Priority Data

Jun. 13, 2014    (JP) .................................. 2014-122840
Dec. 22, 2014    (JP) .................................. 2014-259192

(51) Int. Cl.
*F16C 35/067*    (2006.01)
*F16C 19/06*    (2006.01)
(Continued)

(52) U.S. Cl.
CPC .............. *F16C 19/06* (2013.01); *F16C 33/58* (2013.01); *F16C 35/067* (2013.01); *F16C 43/04* (2013.01);
(Continued)

(58) Field of Classification Search
CPC ........ F16C 19/06; F16C 33/58; F16C 35/067; F16C 2226/52
See application file for complete search history.

(56) References Cited

U.S. PATENT DOCUMENTS 7,246,948 B2 *    7/2007    Fisk ..................... B21D 19/088
                                                          384/537
8,091,240 B2 *    1/2012    Katougi ................ F16C 33/586
                                                          29/505
(Continued)

FOREIGN PATENT DOCUMENTS

CN    101617138 A    12/2009
DE    102004031830 A1    1/2006
(Continued)

OTHER PUBLICATIONS

Search Report dated Sep. 8, 2015, issued by the International Searching Authority in counterpart International Patent Application No. PCT/JP2015/066951 (PCT/ISA/210).
(Continued)

*Primary Examiner* — Thomas R Hannon
(74) *Attorney, Agent, or Firm* — Sughrue Mion, PLLC

(57) ABSTRACT

An outer peripheral surface of the small-diameter step portion is formed with an engagement groove extending in a circumferential direction. The retainer plate has a plurality of engagement claws protruding radially inward from an inner periphery of the retainer plate defining the fitting hole and configured to be engaged to the engagement groove. In a state that the fitting hole is fitted to the small-diameter step portion, the engagement claws are formed by axially pressing the inner periphery of the retainer plate, including at least thickness reduction parts formed in advance at a peripheral edge between an inner peripheral surface of the fitting hole and a side surface of the retainer plate, and plastically deforming the inner periphery of the retainer
(Continued)

plate so as to protrude radially inward, and the engagement claws are engaged to the engagement groove.

5 Claims, 24 Drawing Sheets

(51) Int. Cl.
    *F16C 33/58*     (2006.01)
    *F16C 43/04*     (2006.01)

(52) U.S. Cl.
    CPC ........ *F16C 33/586* (2013.01); *F16C 2226/52* (2013.01); *F16C 2226/60* (2013.01)

(56) References Cited

U.S. PATENT DOCUMENTS

| | | | | |
|---|---|---|---|---|
| 8,424,209 | B2 * | 4/2013 | Katougi | ............ F16C 33/586 |
| | | | | 29/505 |
| 9,903,416 | B2 * | 2/2018 | Ishibashi | ............ F16C 35/045 |
| 2009/0263063 | A1 | 10/2009 | Komori | |

FOREIGN PATENT DOCUMENTS

| | | | |
|---|---|---|---|
| DE | 102009004653 A1 | 5/2010 | |
| EP | 2 014 937 A2 | 1/2009 | |
| EP | 2853762 A4 * | 3/2016 | ............ F16C 35/067 |
| JP | 2000-74079 A | 3/2000 | |
| JP | 2000-87980 A | 3/2000 | |
| JP | 2007-263360 A | 10/2007 | |
| JP | 4877044 B2 | 2/2012 | |
| JP | 2013-29148 A | 2/2013 | |
| JP | 2014-29196 A | 2/2014 | |
| JP | 2015-94383 A | 5/2015 | |
| JP | 2015-102138 A | 6/2015 | |
| WO | 2009/132818 A1 | 9/2015 | |

OTHER PUBLICATIONS

Written Opinion dated Sep. 8, 2015, issued by the International Searching Authority in counterpart International Patent Application No. PCT/JP2015/066951 (PCT/ISA/237).

Communication dated Jun. 8, 2017, from the European Patent Office in counterpart European Application No. 15807055.7.

Communication dated Mar. 28, 2018, issued by The State Intellectual Property Office in counterpart Chinese application No. 201580031683.X.

* cited by examiner

BEARING DEVICE AND METHOD FOR MANUFACTURING BEARING DEVICE

TECHNICAL FIELD

The present invention relates to a bearing device and a method for manufacturing the bearing device, and more specifically, to a bearing device to be used for a rotation support part of a gear or the like of a transmission or a differential gear device and a method for manufacturing the bearing device.

RELATED ART

In the related art, a bearing device configured to support a rotary shaft for which a pulley, a gear and the like of a transmission for an automobile are provided has been known which includes a rolling bearing having a plurality of rolling elements arranged between an inner ring and an outer ring and a retainer plate configured to fix the rolling bearing to a housing with being in contact with an axial end surface of the outer ring of the rolling bearing. Also, in recent years, it is needed to miniaturize the automobile and the transmission. As the bearing device satisfying the need, a bearing device has been known in which a small-diameter step portion is provided on an outer peripheral surface of an axial end portion of the outer ring of the rolling bearing and a fitting hole of the retainer plate is fitted to the small-diameter step portion (for example, refer to Patent Documents 1 and 2).

FIG. 22 depicts an example of a bearing device 100 of the related art. An end portion of a rotary shaft 101 is rotatably supported to a housing 103 via a radial rolling bearing 102. The radial rolling bearing 102 has an outer ring 105 having an outer ring raceway 104 on an inner peripheral surface, an inner ring 107 having an inner ring raceway 106 on an outer peripheral surface, and a plurality of balls 108 provided so as to be freely rollable between the outer ring raceway 104 and the inner ring raceway 106. The outer ring 105 of the radial rolling bearing 102 is internally fitted to a retaining concave part 109 formed at the housing 103. A fitting hole 113 of a retainer plate 110 is rotatably externally fitted to a small-diameter step portion 112 formed on an outer peripheral surface of one axial end portion of the outer ring 105. Also, the retainer plate 110 is fixed to the housing 103 by a plurality of screws inserted into a plurality of through-holes (not shown) of the retainer plate 110. Thereby, the outer ring 105 is prevented from separating from the retaining concave part 109.

A bearing device 200 disclosed in Patent Document 1 has a radial rolling bearing 210 and a retainer plate 220 having a substantially triangular plate shape and configured to fix the radial rolling bearing 210 to a housing (not shown), as shown in FIGS. 23A and 23B. A small-diameter step portion 212 is formed on outer peripheral surface of an axial end portion of an outer ring 211 of the radial rolling bearing 210. An outer peripheral surface of the small-diameter step portion 212 is formed with an engagement groove 213 along an entire circumference. The retainer plate 220 has three attachment holes 224 provided in correspondence to each apex of the triangle and a fitting hole 221 to be fitted with the small-diameter step portion 212 of the outer ring 211. An inner periphery of the fitting hole 221 is formed with concave portions 223 at three places. After fitting the fitting hole 221 to the small-diameter step portion 212, the concave portions 223 are axially pressed and plastically deformed by a punch of a press device, so that the inner periphery of the fitting hole 221 is formed with engagement claws 222 protruding radially inward. Thereby, the engagement claws 222 are engaged to the engagement groove 213 of the small-diameter step portion 212, so that the outer ring 211 and the retainer plate 220 are mounted to be relatively rotatable without separating from each other.

CITATION LIST

Patent Documents

Patent Document 1: Japanese Patent No. 4,877,044B
Patent Document 2: Germany Patent Application Publication No. 102004031830A

SUMMARY OF THE INVENTION

Problems to be Solved

According to the hearing device 200 disclosed in Patent Document 1, the concave portions 223 having a uniform thickness are pressed by the press working, so that the engagement claws 222 are formed. Therefore, it is possible to stably form the engagement claws 222. Also, the concave portions 223 are formed up to an adjacency of an end portion (axially outboard side wall) of the engagement groove 213. Therefore, when forming the engagement claws 222 by the punch, it is possible to securely prevent interference between the engagement claws 222 and the outer peripheral surface of the small-diameter step portion 212. However, the bearing device 200 requires many processing processes because the concave portions 223 are formed on the inner periphery of the fitting hole 221 of the retainer plate 220 by the punch or the like, punching processing for forming an inner diameter shape is performed and end surfaces of the concave portions 223 are then axially pressed to form the engagement claws 222 by a separate punch device or the like. For this reason, an efficiency of an operation of assembling the bearing device is lowered, so that the productivity is low and the number of necessary molds increases, which increases the cost.

In the meantime, as shown in FIGS. 24A and 24B, when it is intended to form the engagement claws 222 by a punch 50 without providing the concave portions 223, the processing process is simple. However, since the inner periphery of the fitting hole 221 is crushed, as it is, protrusion amounts (protrusion heights) of the engagement claws 222 are different if the thickness of a flat plate material is not uniform. For this reason, when performing the crushing processing, the engagement claw 222 may not be formed in the engagement groove 213 and may interfere with the outer peripheral surface of the small-diameter step portion 212 at a front side (axial end surface-side) of the engagement groove 213. Also, since the fitting hole 221 is formed from the flat plate material by one punching processing, a length in a plate thickness direction of a fracture part 221b increases, so that the protrusion amounts (protrusion heights) of the engagement claws 222 become unstable. In the meantime, a reference numeral 221a in FIG. 24A indicates a shear part.

Additionally, when the crushing processing is further performed from a state where the engagement claw 222 interferes with the outer peripheral surface of the small-diameter step portion 212, a projection 222a is formed on an upper surface of the engagement claw 222, as shown in FIGS. 25A and 25B. A thickness of the projection 222a is about a clearance between the outer ring 211 and the retainer plate 220, i.e., is very small. Also, since the outer ring 211 and the retainer plate 220 can relatively move within a range of the clearance, the projection 222a and the outer ring 211 are axially contacted. If the contact is repeatedly made (vibrations upon transportation or upon assembling to a device), the projection 222a is removed and may become a foreign matter.

Further, even when the engagement claw 222 is formed in the engagement groove 213, a tip portion of the engagement claw 222 has a tapered shape, as shown in FIG. 26, and the tip portion is squashed due to the contact with the outer ring 211 during the forming or after the forming The present invention has been made in view of the above situations, and an object of the present invention is to provide a bearing device and a method for manufacturing the bearing device capable of stably forming engagement claws to improve productivity while preventing interference with an outer ring.

Means for Solving the Problems

The object of the present invention is accomplished by following configurations.

(1) A bearing device including:
a rolling bearing having, an inner ring, an outer ring, having a small-diameter step portion provided on an outer periphery of an axial end portion thereof, and a plurality of rolling elements arranged to be freely rollable between the inner ring and the outer ring, and
a retainer plate having a fitting hole to be fitted to the small-diameter step portion and configured to fix the rolling bearing to a housing,
wherein an outer peripheral surface of the small-diameter step portion is formed with an engagement groove extending in a circumferential direction,
wherein the retainer plate has a plurality of engagement claws protruding radially inward from an inner periphery of the retainer plate defining the fitting hole and configured to be engaged to the engagement groove, and
wherein in a state that the fitting hole is fitted to the small-diameter step portion, the engagement claws are formed by axially pressing, the inner periphery of the retainer plate, including at least thickness reduction parts formed in advance at a peripheral edge between an inner peripheral surface of the fitting hole and a side surface of the retainer plate, and plastically deforming the inner periphery of the retainer plate so as to protrude radially inward, and the engagement claws are engaged to the engagement groove.

(2) In the bearing device of the above (1), the fitting hole has a plurality of relief parts of which an inner diameter is greater than other part, and
each of the thickness reduction parts has an arc length shorter than an arc length of the relief part and is formed at a peripheral edge between an inner peripheral surface of the relief part and the side surface of the retainer plate.

(3) In the bearing device of the above (1) or (2), the retainer plate is formed with at least three attachment holes, into which fastening screws for fixing the bearing device to the housing are to be screwed or inserted, at radially outer sides of the fitting hole, and
the engagement claws are respectively provided at a circumferentially intermediate phase of the attachment holes adjacent in the circumferential direction.

(4) A method for manufacturing a hearing device including a rolling bearing having an inner ring, an outer ring having a small-diameter step portion provided on an outer periphery of an axial end portion thereof, and a plurality of rolling elements arranged to be freely rollable between the inner ring and the outer ring, and a retainer plate having a fitting hole to be fitted to the small-diameter step portion and configured to fix the rolling bearing to a housing, the method including:
forming thickness reduction parts at a peripheral edge between an inner peripheral surface of the fitting hole and a side surface of the retainer plate, and
after fitting the small-diameter step portion to the fitting hole, forming engagement claws by axially pressing an inner periphery of the retainer plate defining the fitting hole, including at least the thickness reduction parts, and plastically deforming the inner periphery of the retainer plate so as to protrude radially inward, and engaging the engagement claws to an engagement groove formed on an outer peripheral surface of the small-diameter step portion and extending in a circumferential direction.

(5) In the method of the above (4), a step of forming the thickness reduction parts is performed before a step of forming the fitting hole by punching processing.

(6) In the method of the above (5), the fitting hole is formed with a shear part and a fracture part by the punching processing, in addition to the thickness reduction parts, and
a total sum of a cross-section height of the thickness reduction part and an axial length of the shear part is equal to or greater than a total sum of an axial pressing amount of the inner periphery of the retainer plate and a thickness of the engagement claw.

(7) In the method of one of the above (4) to (6), the fitting hole has a plurality of relief parts of which an inner diameter is greater than other part, and
each of the thickness reduction parts has an arc length shorter than an arc length of the relief part and is formed at a peripheral edge between an inner peripheral surface of the relief part and the side surface of the retainer plate.

Effects of the Invention

According to the bearing device of the present invention, in a state that the fitting hole is fitted to the small-diameter step portion of the outer ring the engagement claws of the retainer plate are formed by axially pressing the inner periphery of the retainer plate, including at least the thickness reduction parts formed in advance at the peripheral edge between the inner peripheral surface of the fitting hole and the side surface of the retainer plate, and plastically deforming the inner periphery of the retainer plate so as to protrude radially inward, and the engagement claws are engaged to the engagement groove of the outer ring. Thereby, it is possible to stably form the engagement claws and to improve productivity of the bearing device while preventing interference between the engagement claws and the outer ring.

Also, when the relief part is formed with the thickness reduction part having an arc length shorter than the relief part, it is possible to increase the lifespan of the punch.

Further, the engagement claws are respectively provided at the circumferentially intermediate phase of the attachment holes adjacent in the circumferential direction, so that a contact surface between the rolling bearing and the retainer plate is secured at a phase at which the attachment hole is formed. Therefore, it is possible to reduce the tensile stress that is to be applied to a corner portion of the small-diameter step portion.

The method for manufacturing a bearing device of the present invention includes the step of forming the thickness reduction parts at the peripheral edge between the inner peripheral surface of the fitting hole and the side surface of the retainer plate, and the step of forming the engagement claws by fitting the fitting hole to the small-diameter step portion, axially pressing the inner periphery of the retainer plate, including at least the thickness reduction parts, and plastically deforming the inner periphery of the retainer plate defining the fitting hole so as to protrude radially inward, and engaging the engagement claws to the engagement groove formed on the outer peripheral surface of the small-diameter step portion and extending in the circumferential direction. Thereby, it is possible to stably form the engagement claws and to improve productivity of the bearing device while preventing interference with the outer ring.

Also, since the thickness reduction parts are formed before the punching processing of the fitting hole, it is possible to improve the forming precision and to increase the lifespan of the punch while suppressing non-uniformity of the engagement claws.

Further, the total sum of the cross-section height of the thickness reduction part and the axial length of the shear part is equal to or greater than the total sum of the axial pressing amount of the inner periphery of the retainer plate and the thickness of the engagement claw. Therefore, the engagement claws are formed without being influenced by a fracture part, so that it is possible to improve the forming precision of the engagement claws.

BRIEF DESCRIPTION OF THE DRAWINGS

FIGS. 6A and 69 are sectional views for illustrating a preferred size relation when forming the engagement claws by crushing processing using a punch.

FIG. 9 depicts a bearing device in accordance with a second embodiment of the present invention, in which

DETAILED DESCRIPTION OF EMBODIMENTS

Hereinafter, a bearing device in accordance with respective embodiments of the present invention will be described in detail with reference to the drawings.

First Embodiment

A bearing device in accordance with a first embodiment of the present invention is described with reference to FIGS. 1A to 6B.

Figure 22:
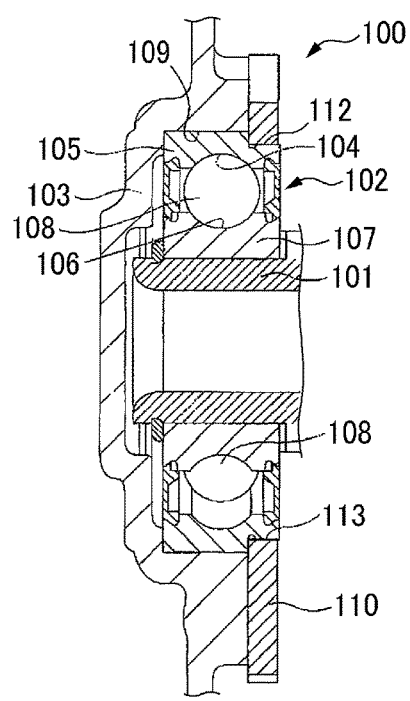
FIG. 22 is a sectional view depicting a general bearing device.

A bearing device 10 has a radial rolling bearing 30 and a retainer plate 40 configured to fix the radial rolling bearing 30 to a housing 103 (refer to FIG. 22). The radial rolling bearing 30 and the retainer plate 40 are mounted so as not to separate from each other, which will be described later.

Figure 4A:
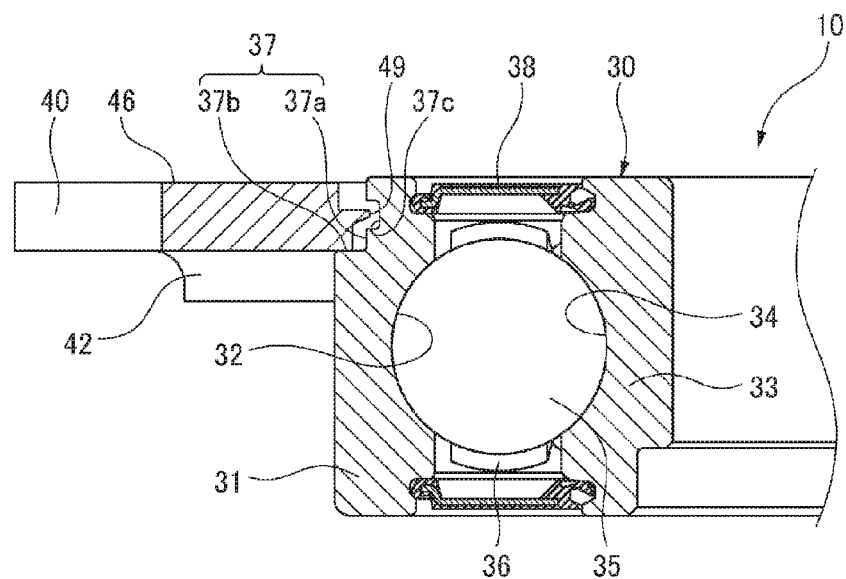
FIG. 4A is a sectional view of the bearing device shown in FIG. 1.

As shown in FIG. 4A, the radial rolling bearing 30 has an outer ring 31 having an outer ring raceway 32 on an inner peripheral surface, an inner ring 33 having an inner ring raceway 34 on an outer peripheral surface, and balls 35, which are a plurality of rolling elements held at a cage 36 and arranged to be freely rollable between the outer ring raceway 32 and the inner ring raceway 34. An outer periphery of one axial end portion of the outer ring 31 is formed with a small-diameter step portion 37 having a step portion outer peripheral surface 37a of which a diameter is smaller than an outer diameter of the outer ring 31 and a step surface 37b extending radially outward from the step portion outer peripheral surface 37a. The step portion outer peripheral surface 37a is formed with an engagement groove 37c along an entire circumference. Also, seal members 38 are arranged at both axial end portions of the outer ring 31 between the outer ring 31 and the inner ring 33. The seal members 38 are provided to seal the radial rolling bearing 30.

Figure 1A:
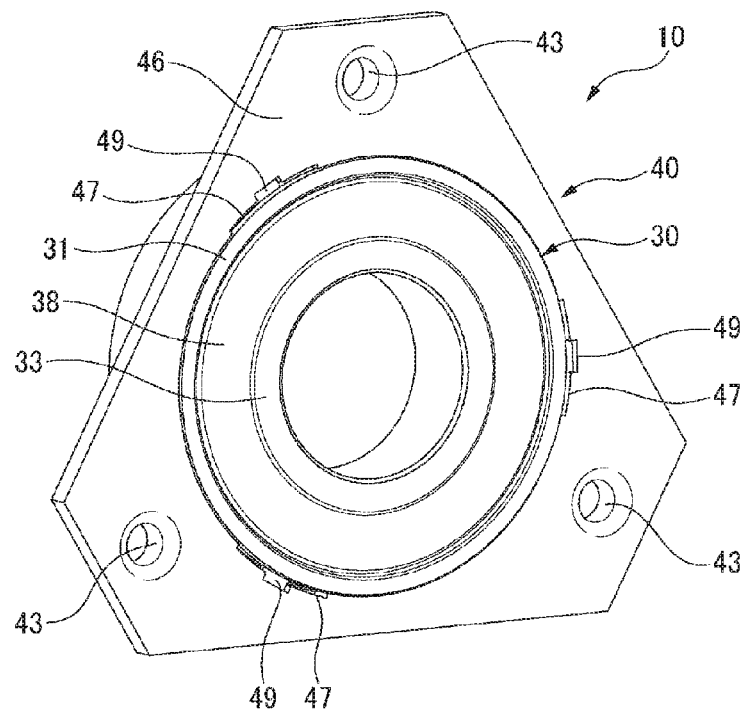
FIG. 1A is a perspective view of a bearing device in accordance with a first embodiment of the present invention, as seen from a backside.
Figure 1B:
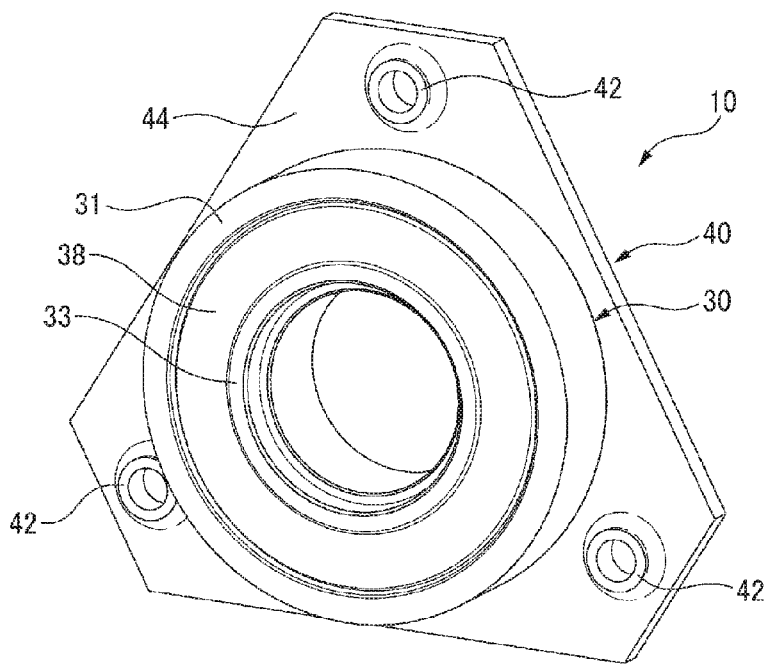
FIG. 1B is a perspective view, as seen from a surface-side.
Figure 2:
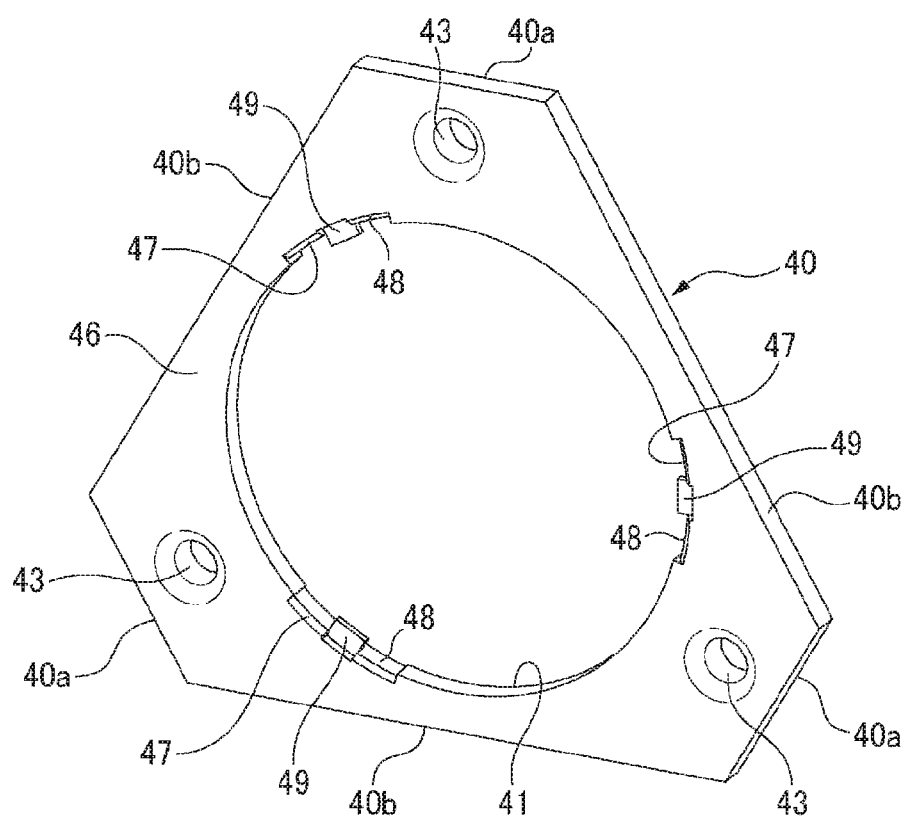
FIG. 2 is a perspective view of a backside of a retainer plate having engagement claws, in which a rolling bearing is omitted from the bearing device of FIG. 1.
Figure 3:
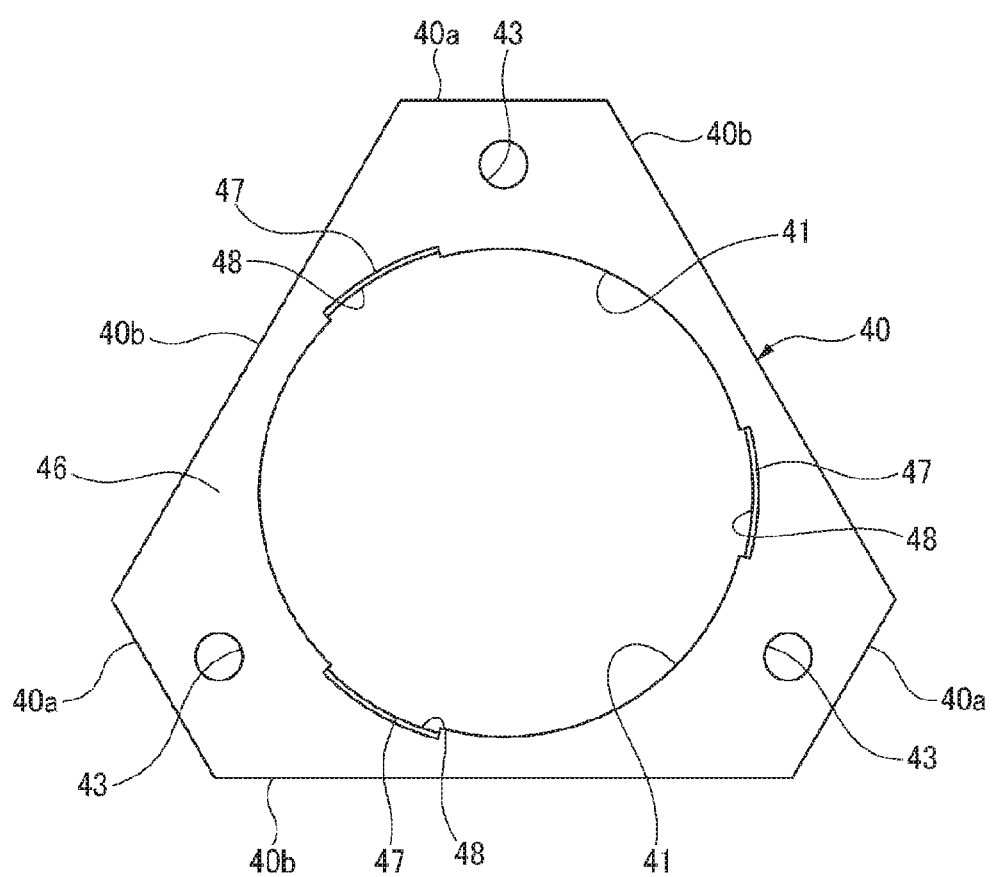
FIG. 3 is a plan view of the backside of the retainer plate before processing the engagement claws.

As shown in FIGS. 2 and 3, the retainer plate 40 is a substantially hexagonal plate member of which short sides 40a and long sides 40b are alternately arranged in a circumferential direction, and is formed at its center with a fitting hole 41 to which the outer ring 31 is to be internally fitted. The fitting hole 41 is formed with relief parts 48 having an inner diameter greater than other part at three places equidistantly spaced in the circumferential direction. Also, boss parts 42 each of which protrudes toward a surface 44-side of the retainer plate 40 are respectively formed at three places corresponding to the short sides 40a and equidistantly spaced in the circumferential direction. The boss part 42 is formed with an attachment hole 43 into which a fastening screw (not shown) for fixing the bearing device 10 to the housing 103 is to be screwed or inserted.

Also, each of three tapered parts 47 is formed at a peripheral edge between an inner peripheral surface of each relief part 48, which is a part of the fitting hole 41, and a backside 46 of the retainer plate 40. Also, each tapered part 47 is formed at its substantially central portion with an engagement claw 49 through crushing processing (which will be described later), which protrudes radially inward from an inner periphery of the retainer plate 40 defining the relief part 48 and is to be engaged to the engagement groove 37c of the outer ring 31.

According to the bearing device 10 configured as described above, after forming the three tapered parts 47 at a planned position, at which the fitting hole 41 of the retainer plate 40 is to be formed, by press working, and the fitting hole 41 (including the relief parts 48) is punched.

Figure 5A:
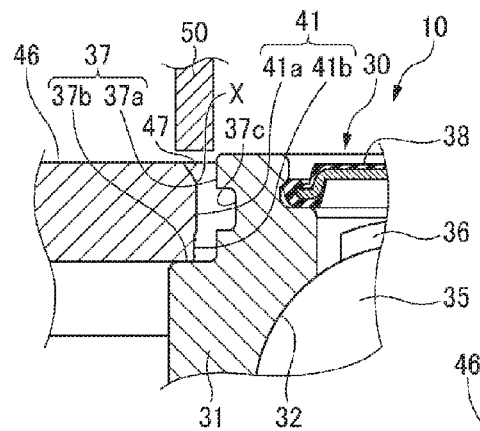
FIGS. 5A to 5D are partially sectional views depicting a process of mounting an outer ring and the retainer plate of the bearing device shown in FIG. 1.
Figure 23A:
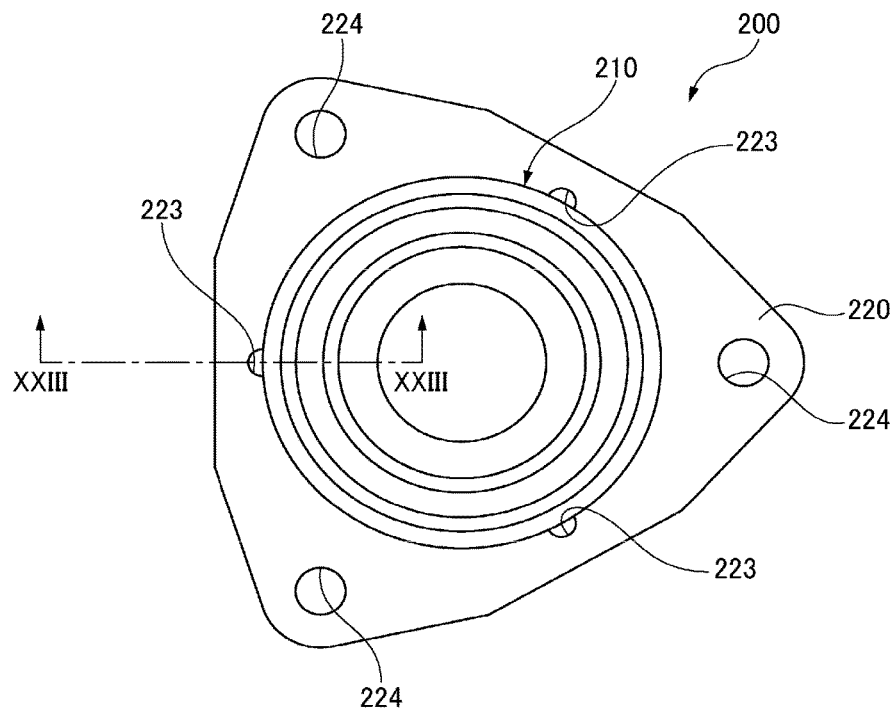
FIG. 23A is a plan view of a bearing device of the related art.
Figure 23B:
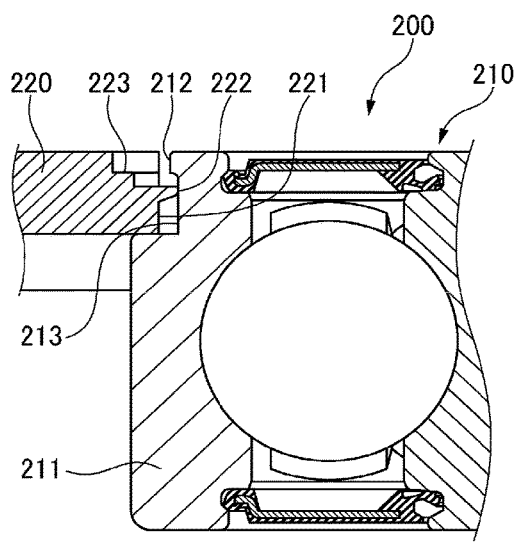
FIG. 23B is a sectional view taken along a line XXIII-XXIII of FIG. 23A.

As shown in FIGS. 5A and 6, the inner peripheral surface of the fitting hole 41 is formed with a shear part 41a and a fracture part 41b by the punching processing. However, in the first embodiment, the fitting hole 41 is punched after forming the tapered parts 47 in advance. Therefore, as compared to the related art shown in FIGS. 23A and 23B where the fitting hole 221 is punched without providing the tapered part, a length of the fracture part 41b is shorter. Since the fracture part 41b has rough surface roughness, relatively low size precision and large non-uniformity, it becomes an unstable factor when forming the engagement claws 49. However, in the first embodiment, since the length of the fracture part 41b is shortened, it is possible to stably form the engagement claws 49.

Meanwhile, in the drawings of FIGS. 5B to 5D and 7 and thereafter, the shear part 41a and the fracture part 41b are not separately shown.

After fitting the fitting hole 41 of the retainer plate 40 to the small-diameter step portion 37 of the outer ring 31, the engagement claws 49 are formed by axially pressing the backside 46 of the retainer plate 40 including the tapered parts 47 of the fitting hole 41 through the crushing processing and then bulging the inner periphery of the retainer plate 40 radially inward. Thereby, the engagement claws 49 are engaged to the engagement groove 37c formed on the step portion outer peripheral surface 37a, and the radial rolling bearing 30 and the retainer plate 40 are mounted to be relatively rotatable without separating from each other.

Figure 5B:
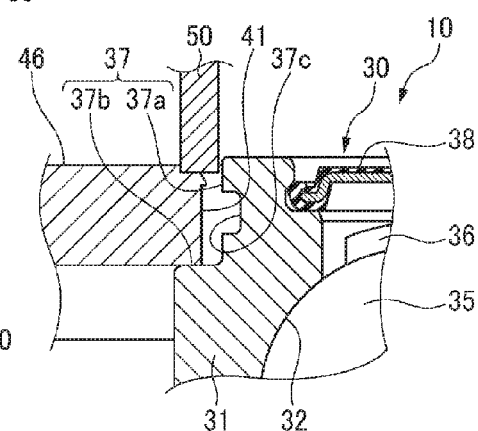

Specifically, as shown in FIG. 5A, after fitting the fitting hole 41 of the retainer plate 40 to the small-diameter step portion 37 of the outer ring 31, a punch 50 of a press device is arranged to extend over both the tapered part 47 of the fitting hole 41 and the backside 46 of the retainer plate 40 and is then axially (downward in FIGS. 5A to 5D) pressed (FIG. 5B). Thereby, the punch 50 is first contacted to the backside 46 of the retainer plate 40, so that the crushing processing starts. Subsequently, the tapered part 47 is crushed and plastically deformed and the engagement claw 49 starts to protrude radially inward, i.e., toward the step portion outer peripheral surface 37a.

Figure 5C:
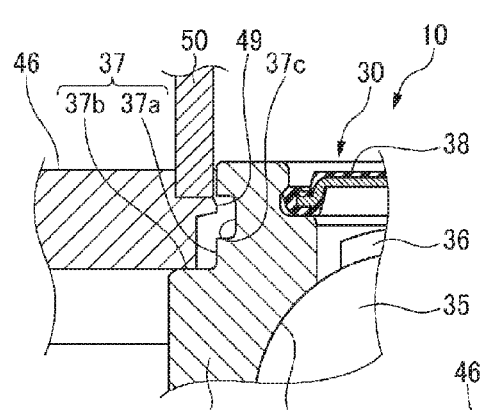

As shown in FIG. 5C, even when the crushing processing by the punch 50 is further progressed and the punch 50 reaches a lower end portion of the tapered part 47, a part of the shape of the tapered part 47 remains at a tip portion of the engagement claw 49 and a gap is maintained between the engagement claw and the step portion outer peripheral surface 37a, so that the engagement claw 49 does not interfere with the step portion outer peripheral surface 37a.

Figure 5D:
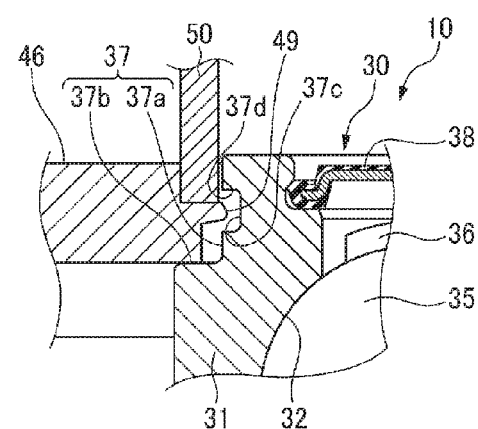

Then, as shown in FIG. 5D, when the punch 50 descends to a predetermined position and the crushing processing is thus over, the engagement claw 49 is formed at an axially intermediate position of the engagement groove 37c with being engaged to the engagement groove 37c at a state where a gap with a bottom of the engagement groove is formed.

Further, the fitting hole 41 is formed with the tapered parts 47 in advance. Thereby, it is possible to manage non-uniformity of a plate thickness, which is a non-uniformity factor of the engagement claws 49, of the inner periphery of the retainer plate 40 (at least an inner periphery of the retainer plate 40 on which the engagement claws 49 are to be formed) to a predetermined thickness and to stably form the engagement claws 49. Also, the tapered parts 47 are formed in advance, so that when processing (punching) the fitting hole 41, a contact area between the punch 50 and the retainer plate 40 gradually increases as the punch 50 descends. For this reason, since load to the punch 50 gradually increases, the punch 50 is difficult to rattle, so that the forming precision is improved and concern about the damage to the punch 50 decreases.

Figure 4B:
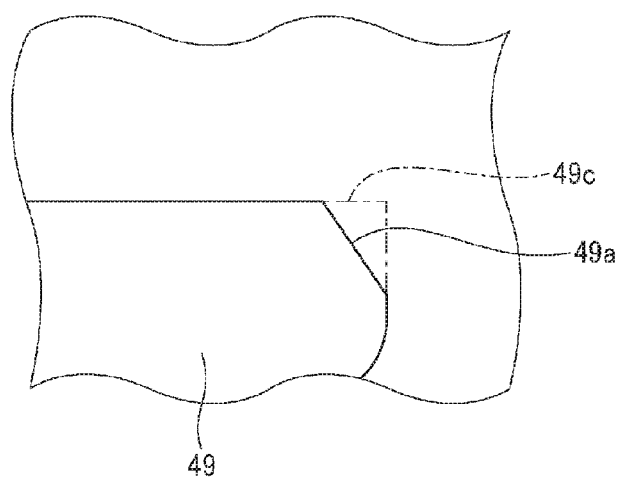
FIG. 4B is an enlarged sectional view of main parts.
Figure 24A:
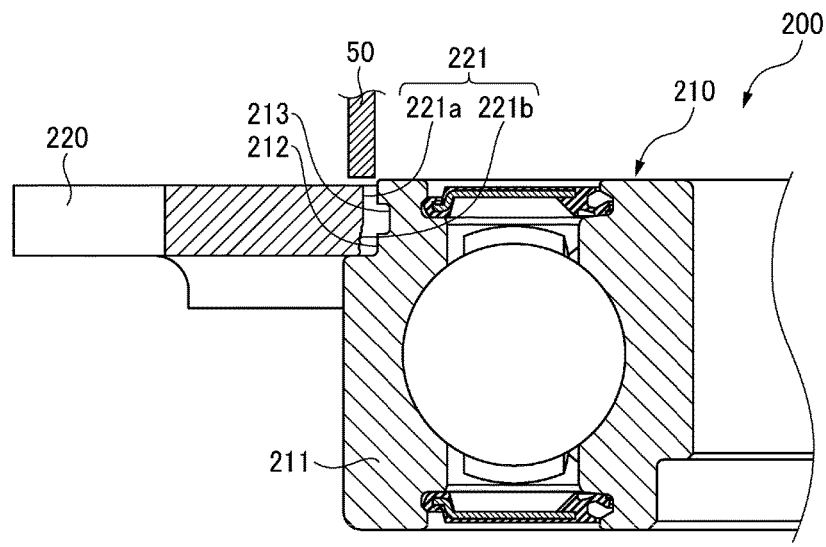
FIGS. 24A and 24B are sectional views depicting a process of mounting the outer ring and the retainer plate in another bearing device of the related art.
Figure 24B:
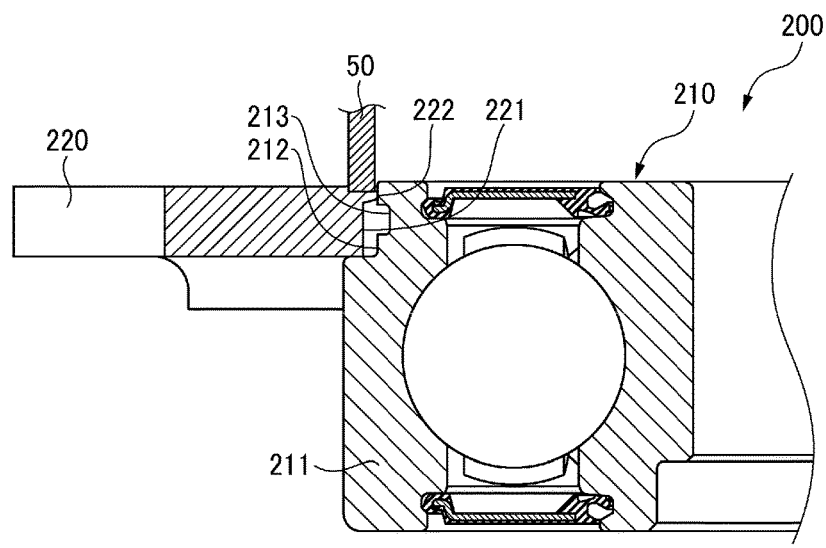
Figure 25A:
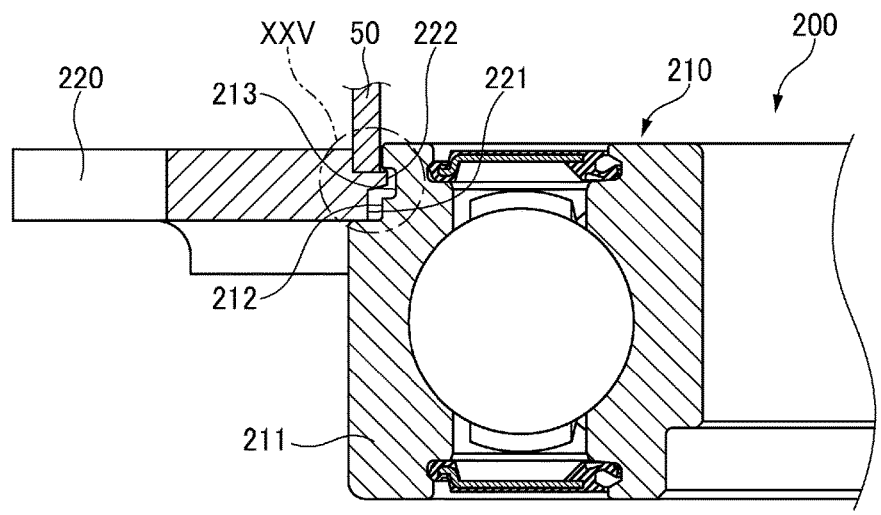
FIG. 25A is a sectional view depicting a process of mounting the outer ring and the retainer plate in another bearing device of the related art.
Figure 25B:
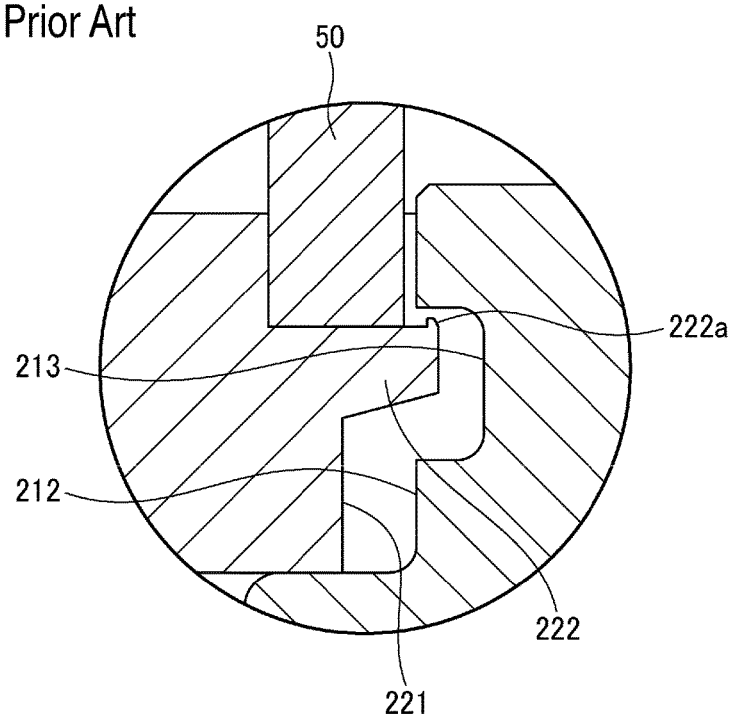
FIG. 25B is an enlarged view of a XXV part of FIG. 25A.
Figure 26:
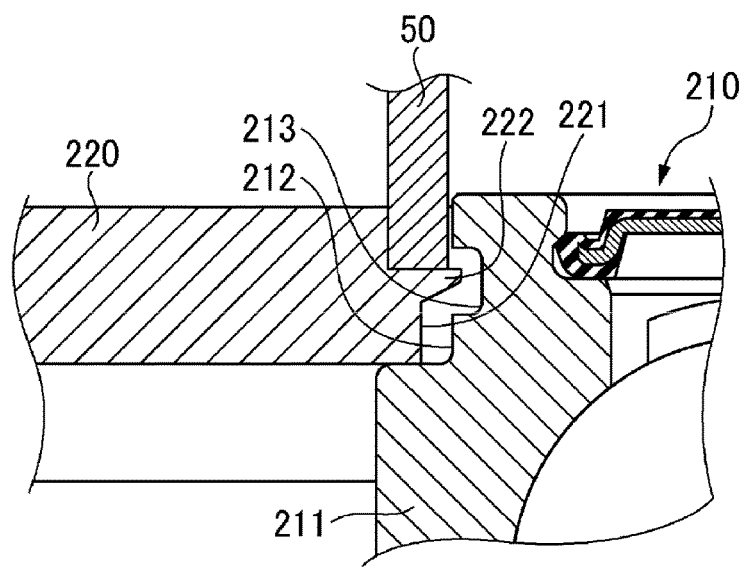
FIG. 26 is a sectional view of still another bearing device of the related art.

Also, the fitting hole 41 is formed with the tapered parts 47 in advance, an that the tip portion of the engagement claw 49 is formed with a plane portion 49a, as shown in FIG. 4B, and is not formed into a sharpened shape (corner portion 49c) (refer to FIGS. 24A and 24B), and it is possible to prevent local crack or loss of the tip portion (corner portion), which is to be caused due to the contact with the outer ring 31 or the like while forming the engagement claw 49 or after forming the engagement claw 49.

Figure 6A:
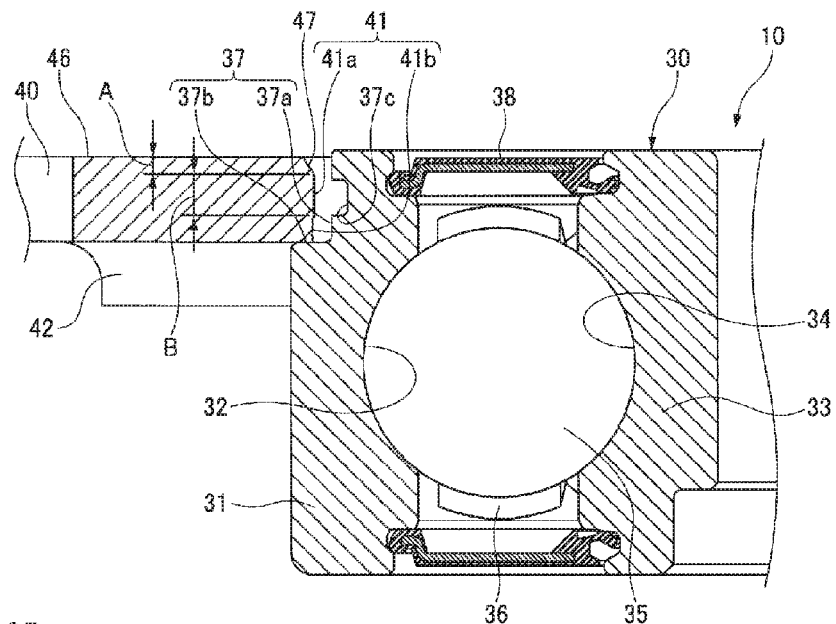
Figure 6B:
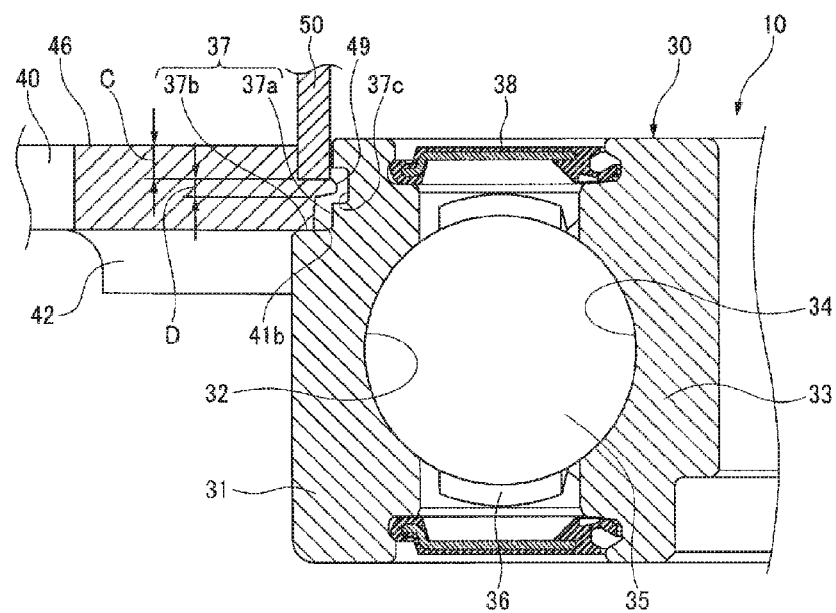

Further, as shown in FIGS. 6A and 6B, when forming the engagement claws 49 at the retainer plate 40 through the crushing processing using the punch 50, if the fracture part 41*b* is influential, the lengths of the engagement claws 49 may be unequal. For this reason, the crushing processing of forming the engagement claws 49 is preferably performed within a precise range of the tapered part 47 and the shear part 41*a*.

Specifically, a total sum of a cross-section height A of the tapered part 47 and an axial length B of the shear part 41*a* before forming the engagement claw (refer to FIG. 6A) is preferably equal to or greater than a total sum of a crushing amount C of the punch 50 and a thickness D of the engagement claw 49 after forming the engagement claw (refer to FIG. 6B) [(A+B)≥(C+D)].

As described above, according to the bearing device 10 of the first embodiment, the small-diameter step portion 37 is formed on the step portion outer peripheral surface 37*a* with the engagement groove 37*c* extending in the circumferential direction, and the retainer plate 40 has the plurality of engagement claws 49 protruding radially inward from the inner periphery of the retainer plate 40 defining the fitting hole 41 and configured to be engaged to the engagement groove 37*c*. With the fitting hole 41 being fitted to the small-diameter step portion 37, the engagement claws 49 are formed by axially pressing the inner periphery of the retainer plate 40, including the backside 46 and parts of the tapered parts 47 formed in advance at the peripheral edge between the inner peripheral surface of the fitting hole 41 and the backside 46, and plastically deforming the inner periphery of the retainer plate 40 so as to protrude radially inward, and are engaged to the engagement groove 37*c*. Thereby, the protrusion heights and formation positons of the engagement claws 49 become stable and the engagement claws 49 and the engagement groove 37*c* are securely engaged, so that it is possible to mount the bearing 30 and the retainer plate 40 each other and to improve the productivity of the bearing device 10. Also, the tip portion of the engagement claw 49 can be formed into a shape having no corner portion, and it is possible to prevent local crack or loss of the tip portion, which is to be caused due to the contact with the outer ring 31 while forming the engagement claw 49 or after forming the engagement claw 49.

A method for manufacturing a bearing device of the first embodiment includes a process of forming the tapered parts 47 at the peripheral edge between the inner peripheral surface of the fitting hole 41 and the backside 46, and a process of forming the engagement claws 49 by fitting the fitting hole 41 to the small-diameter step portion 37, axially pressing the inner periphery of the retainer plate 40, including parts of the tapered parts 47 and the backside 46, and plastically deforming the inner periphery of the retainer plate 40 so as to protrude radially inward, and engaging the engagement claws to the engagement groove 37*c* formed on the step portion outer peripheral surface of the small-diameter step portion 37 and extending in the circumferential direction. Thereby, it is possible to equally make the thickness of the retainer plate 40 before the engagement claws 49 are formed by the tapered parts 47, so that it is possible to stably form the shape, height, position and the like of the engagement claws 49. Thereby, it is possible to efficiently assemble the bearing device 10.

Also, the process of forming the tapered parts 47 is performed before the process of forming the fitting hole 41 by the punching processing. Therefore, when a stroke of the press device configured to form the tapered parts 47 is managed, the non-uniformity of the plate thickness, which is an unstable factor upon formation of the engagement claws 49, is reduced and a length in the plate thickness direction of the fracture part 41*b* of the fitting hole 41 to be formed by the punching is shortened, so that it is possible to stably form the engagement claws 49.

In the meantime, it is difficult to uniformly determine the shape of the tapered part 47 such as an angle, an axial length and the like because the thickness of the retainer plate 40 is diverse. However, as shown in FIG. 5A, an inner-diameter end X of the tapered part 47 is preferably formed to face radially the step portion outer peripheral surface 37*a* of the small-diameter step portion 37 positioned at a more axially outboard side than the formation position of the engagement groove 37*c*.

Also, the fitting hole 41 is formed with the shear part 41*a* and the fracture part 41*b* by the punching processing, in addition to the tapered parts 47, and the total sum of the cross-section height A of the tapered part 47 and the axial length B of the shear part 41*a* is equal to or greater than the total sum of the axial pressing amount of the inner periphery of the retainer plate 40, i.e., the crushing amount C by the punch 50 and the thickness D of the engagement claw 49. Thereby, the engagement claws 49 are formed without being influenced by the fracture part 41*b*, so that it is possible to improve the forming precision of the engagement claws 49.

When transporting the bearing device 10 or when mounting the bearing device 10 to the housing, the retainer plate 40 and the bearing 30 are necessarily required to relatively rotate without separating from each other. Therefore, the engagement claws 49 are formed with gaps between the engagement claws and the engagement groove 37*c* of the small-diameter step portion 37. In the meantime, at a state where the retainer plate 40 is fastened and fixed to the housing by screws and the bearing 30 is thus fitted and fixed to the housing, the retainer plate 40 is applied with axial load, so that the retainer plate 40 is slightly deformed. The engagement claw 49 is formed to have a shape and to be positioned so that it does not interfere with the groove bottom and both sidewalls of the engagement groove 37*c* even at this state. By this configuration, the engagement claw 49 can secure the strength enough to endure the inertia force of the bearing 30 upon the transportation and upon the mounting, so that it is possible to make the engagement claw 49 small, to enlarge the application range of the bearing device 10 and to reduce the press load (to save the assembling cost).

Figure 7A:
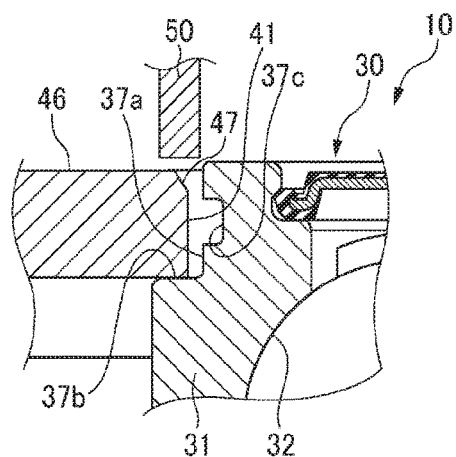
FIGS. 7A to 7C are partially sectional views depicting a process of mounting the outer ring and the retainer plate of a bearing device in accordance with a modified embodiment of the first embodiment.
Figure 7B:
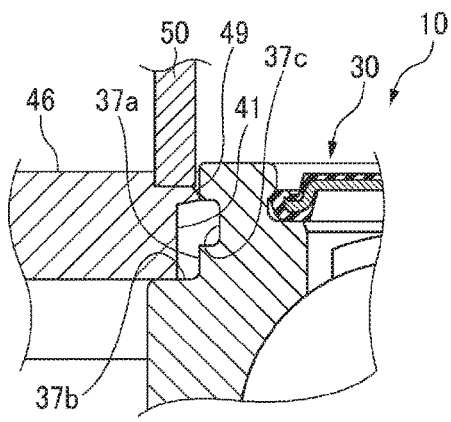
Figure 7C:
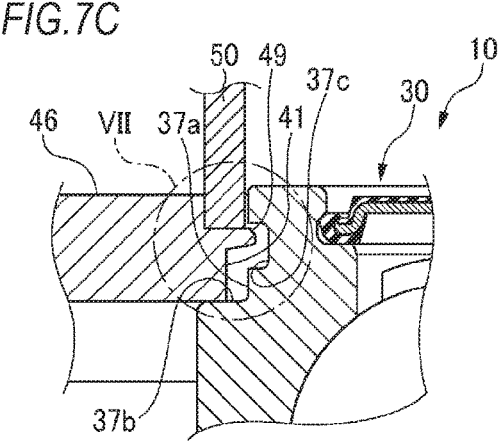
Figure 7D:
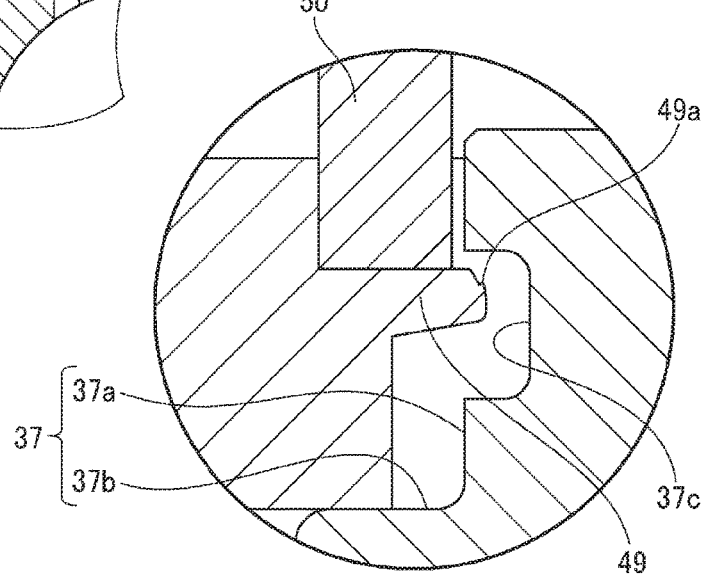
FIG. 7D is an enlarged view of a VII part of FIG. 7C.
Figure 8A:
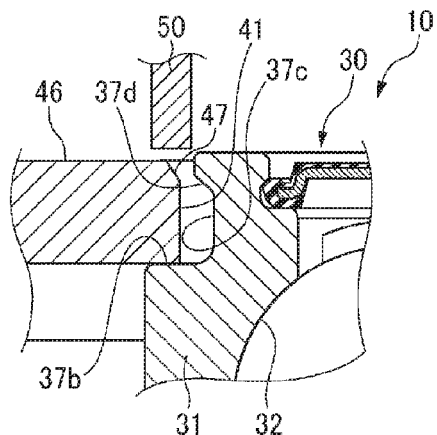
FIGS. 8A to 8D are partially sectional views depicting a process of mounting the outer ring and the retainer plate of a bearing device in accordance with another modified embodiment of the first embodiment.
Figure 8B:
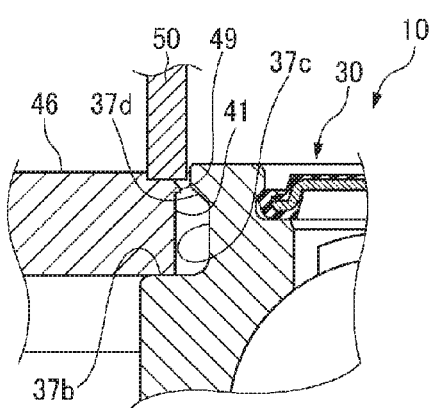
Figure 8C:
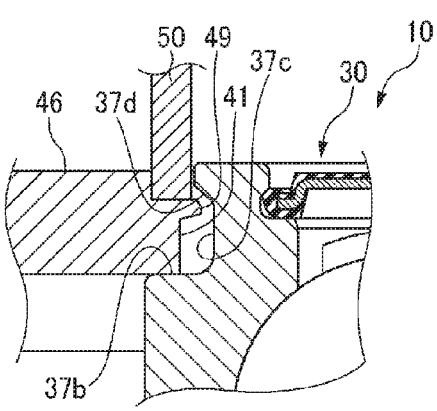
Figure 8D:
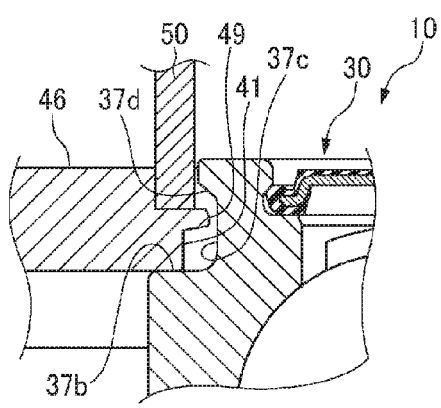

Also, as shown in FIGS. 7A to 7C, when the engagement claw 49 is formed after interfering with the step portion outer peripheral surface 37*a* of the small-diameter step portion 37 during the crushing processing, the protrusion 49*a* of the first embodiment is formed at a position at which it does not protrude from an axial side surface of the engagement claw 49. For this reason, even when vibrations occur upon the transportation or upon the mounting to a device, the protrusion 49*a* and the outer ring 31 do not contact directly each other in the axial direction, so that the protrusion 49*a* is difficult to be removed and to be a foreign matter.

Also, the engagement groove 37*c* of the small-diameter step portion 37 may be formed so that an axially outboard side wall 37*d* is inclined axially outward as it faces radially outward, like a first modified embodiment shown in FIGS. 8A to 8D. Thereby, even when the engagement claw 49 is formed from an early stage of the crushing processing, the engagement claw 49 is securely formed in the engagement groove 37*c* without interfering with the step portion outer peripheral surface 37*a* of the small-diameter step portion 37.

In the meantime, as shown in FIGS. 8A to 8D, the engagement groove 37c may be formed so that an axially inboard side wall is continuous to the step surface 37b.

Second Embodiment

Subsequently, a bearing device in accordance with a second embodiment of the present invention is described with reference to FIGS. 9 to 11.

Figure 9A:
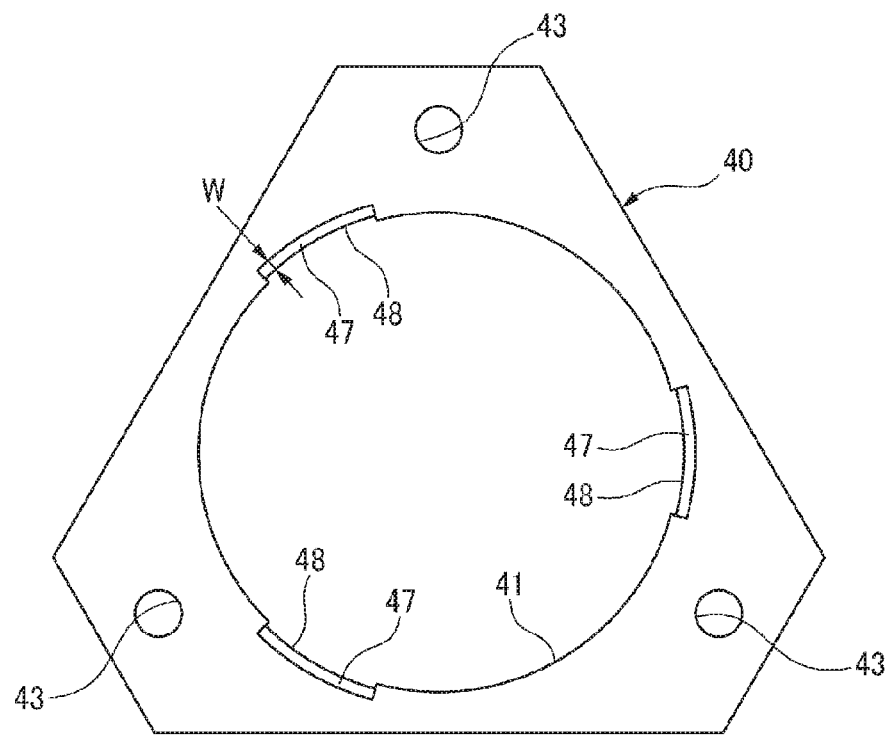
FIG. 9A is a plan view of the backside of the retainer plate before processing the engagement claws and FIG. 9B is a sectional view depicting a process of mounting the outer ring and the retainer plate.
Figure 9B:
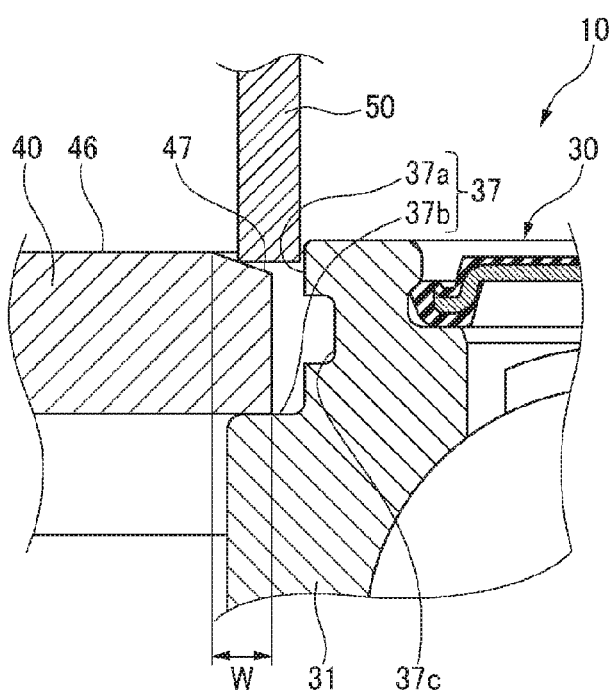

As shown in FIG. 9, the tapered part 47 of the retainer plate 40 of the second embodiment is formed to have a radial width W greater than the first embodiment. Also, an outer diameter of the tapered part 47 is set to be located at a radially outermore side than an outer diameter of the punch 50 when the retainer plate 40 having the fitting hole 41 to be fitted to the small-diameter step portion 37 is set to the press device. Therefore, the punch 50 crushes only the tapered part 47 to form the engagement claw 49 without contacting (crushing) the backside 46 of the retainer plate 40 (refer to FIG. 11).

Figure 10A:
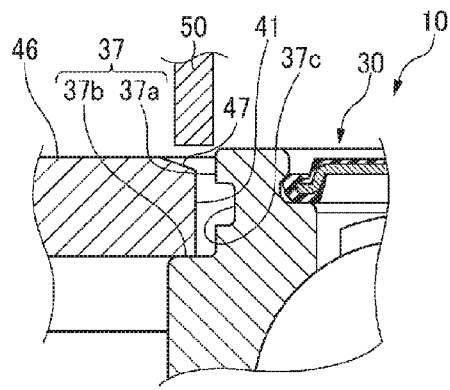
FIGS. 10A to 10D are partially sectional views depicting a process of mounting the outer ring and the retainer plate shown in FIG. 9.
Figure 10B:
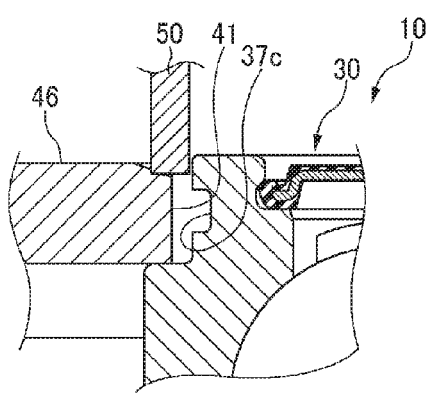
Figure 10C:
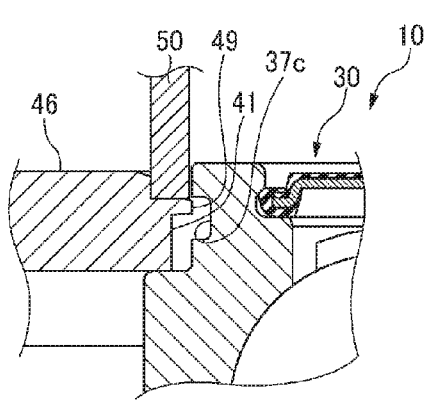
Figure 10D:
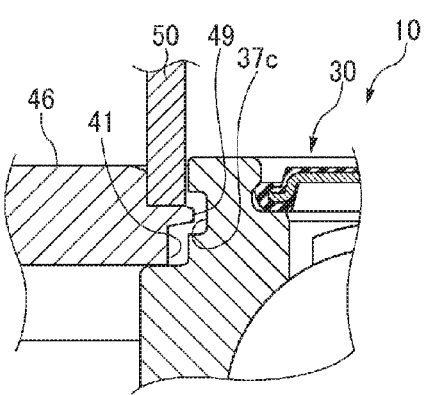
Figure 11:
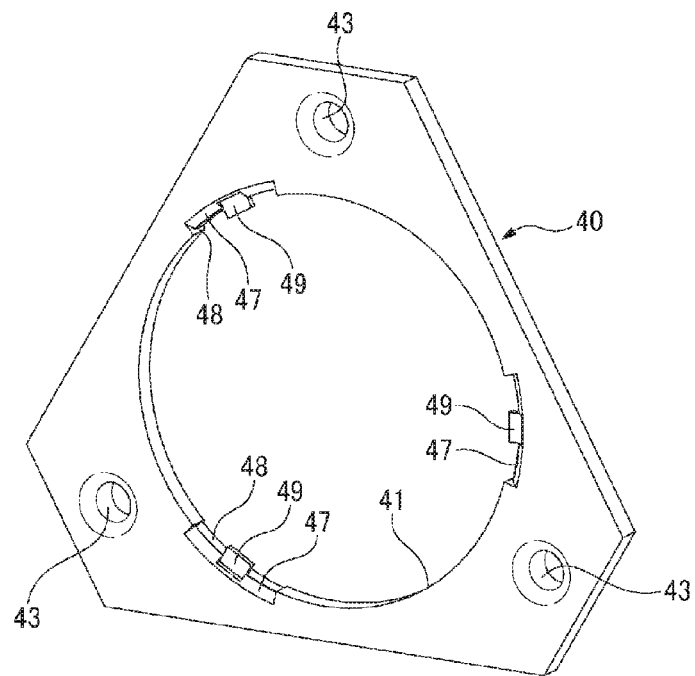
FIG. 11 is a perspective view of the backside of the retainer plate having engagement claws, in which the rolling bearing is omitted from the bearing device of the second embodiment.

Specifically, as shown in FIGS. 10A to 10D, after fitting the fitting hole 41 of the retainer plate 40 to the small-diameter step portion 37 of the outer ring 31, the punch 50 is arranged to face the tapered part 47 of the fitting hole 41 and presses the same (FIG. 10A). Thereby, the tapered part 47 is crushed and plastically deformed and the engagement claw 49 protrudes radially inward. At this time, since the contact part of the punch 50 is reduced as to the thickness by the tapered part 47, the inner peripheral surface of the relief part 48 is not crushed until the punch 50 contacts the tapered part 47, and the start timing of the plastic deformation of the engagement claw 49 is delayed (FIG. 10B), as compared to the retainer plate 40 of the first embodiment. After the punch 50 reaches the tapered part 47, the engagement claw 49 is formed in the engagement groove 37c (FIGS. 10C and 10D) through the crushing processing, like the retainer plate 40 of the first embodiment, and the outer ring 31 of the rolling bearing 30 and the retainer plate 40 are connected so as not to separate from each other, so that the bearing device 10 is assembled.

The other configurations and operational effects are the same as the first embodiment.

Figure 12:
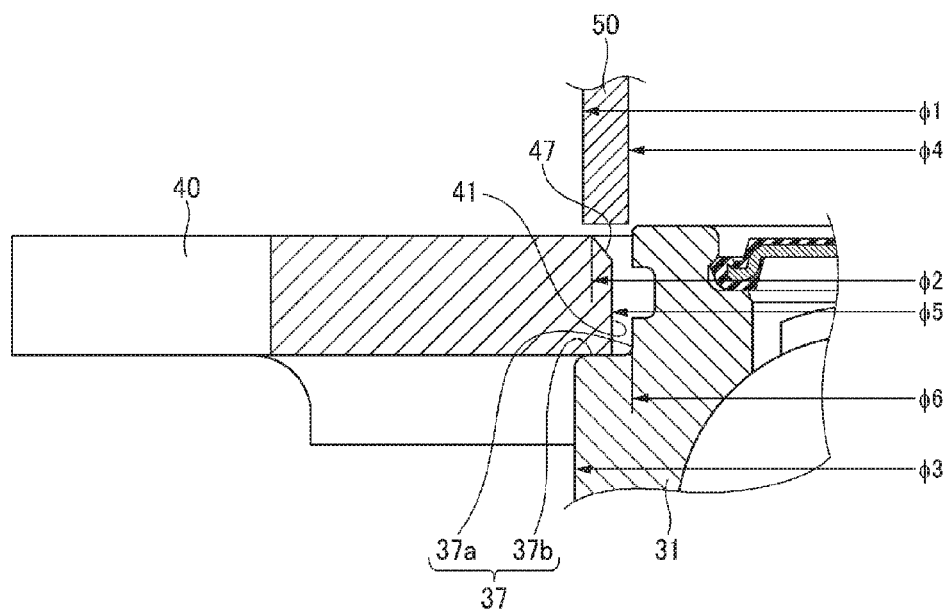
FIG. 12 is a sectional view for illustrating a positional relation of a small-diameter step portion, a tapered part and the punch.

Therefore, in the bearing device 10 of the first and second embodiments, a condition relating to shapes of the punch 50 and the tapered part 47 for forming the engagement claw 49 is as follows. That is, as shown in FIG. 12, when an outer diameter of the punch 50 is denoted as φ1, an inner diameter of the punch 50 is denoted as φ4, an outer diameter of the fitting hole 41 of the tapered part 47 is denoted as φ2, an inner diameter of the tapered part 47 is denoted as φ5, an outer diameter of the small-diameter step portion 37 is denoted as φ6 and an outer diameter of the outer ring 31 is denoted as φ3, a relation of φ5≥φ4>φ6 is satisfied in any embodiment. Also, a relation of φ3≥φ1 is preferably satisfied.

Also, a relation of φ1≥φ2 is satisfied in the first embodiment and a relation of φ2≥φ1 is satisfied in the second embodiment.

Third Embodiment

Figure 13A:
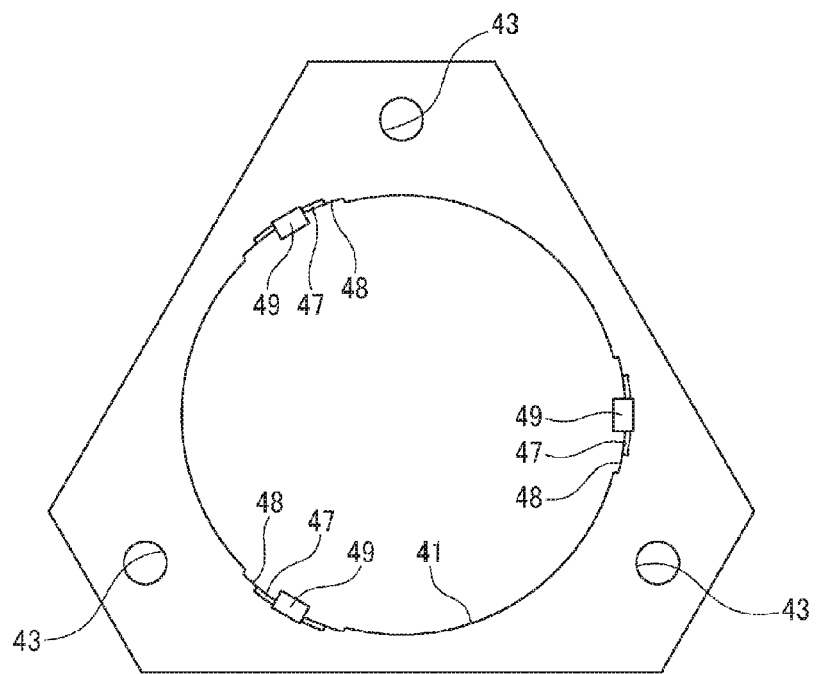
FIG. 13A is a front view of the retainer plate, depicting a positional relation between a relief part of a fitting hole and the tapered part and curved surface part in a bearing device in accordance with a third embodiment of the present invention.
Figure 13B:
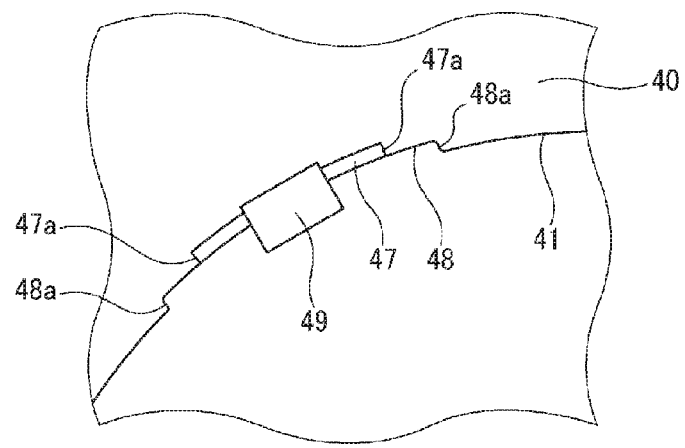
FIG. 13B is an enlarged view of main parts.

In the below, a bearing device in accordance with a third embodiment of the present invention is described with reference to FIGS. 13A to 14.

In the first and second embodiment, the relief part 48 and the tapered part 47 are formed to have the same arc length. However, in the third embodiment, the tapered part 47 has an arc length shorter than an arc length of the relief part 48, and is formed at the peripheral edge between the inner peripheral surface of the relief part 48 and the backside 46 of the retainer plate.

Thereby, since positions of a circumferential end portion 47a of the tapered part 47 and a circumferential end portion 48a of the relief part 48 are different, it is possible to reduce load that is to be applied to a punch form, particularly to a corner part of a form configured to form the circumferential end portion 48a of the relief part 48.

The other configurations and operations are the same as the first and second embodiments.

Figure 14:
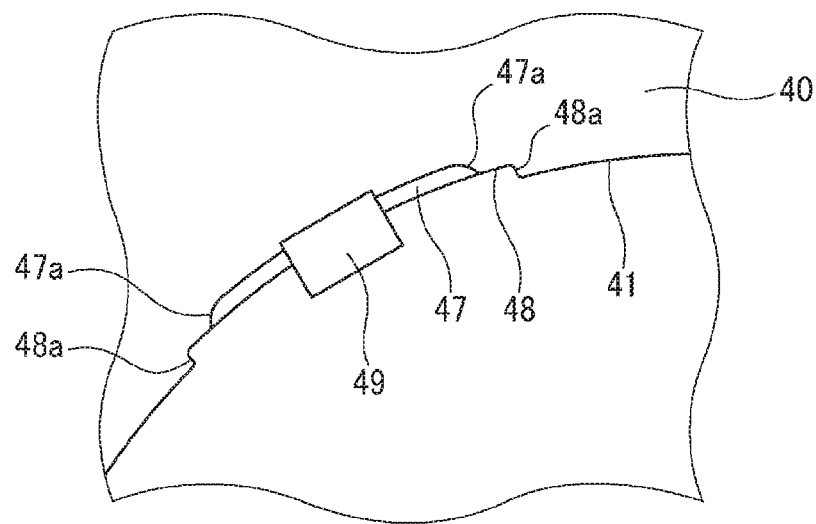
FIG. 14 is an enlarged view of main parts of the retainer plate, depicting a positional relation between the relief part of the fitting hole and the tapered part and curved surface part in a bearing device in accordance with a modified embodiment of the third embodiment of the present invention.

In the meantime, as shown in FIG. 14 depicting a modified embodiment of the third embodiment, the circumferential end portion 47a of the tapered part 47 may be formed to have an arc shape. In this case, the load to be applied to the form is further reduced.

Fourth Embodiment

Subsequently, a bearing device in accordance with a fourth embodiment of the present invention is described with reference to FIGS. 15 and 16.

Figure 15:
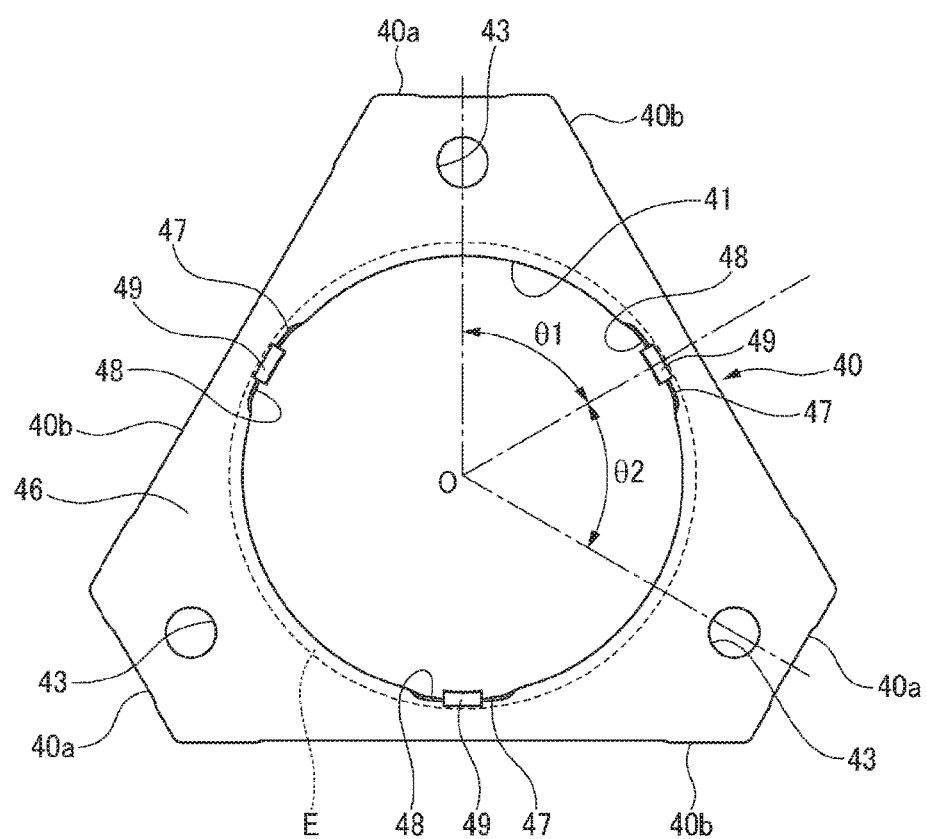
FIG. 15 is a plan view of the backside of the retainer plate to be applied to a bearing device in accordance with a fourth embodiment of the present invention.

In the fourth embodiment, as shown in FIG. 15, the relief parts 48 and the engagement claws 49 formed at the retainer plate are provided at a circumferentially intermediate phase of the attachment holes 43 adjacent in the circumferential direction.

Specifically, in the fourth embodiment, the relief part 48 and the engagement claw 49 are formed at a phase of about a half of a center-to-center angle between two lines connecting a center O of the fitting hole 41 and centers of the attachment holes 43 adjacent in the circumferential direction, i.e., at a phase at which angles θ1, θ2 between each of the two lines and a line connecting the center O of the fitting hole 41 and intermediate positions of the relief part 48 and the engagement claw 49 become θ1=θ2.

Figure 16:
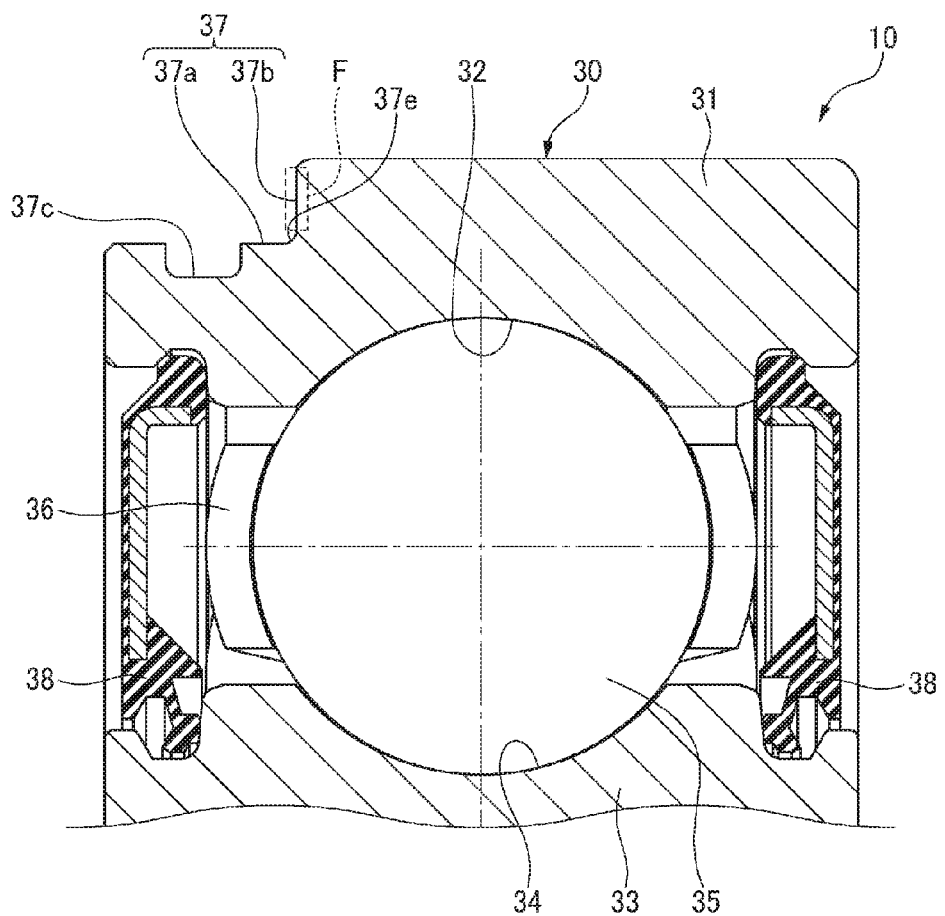
FIG. 16 is a partially sectional view of the rolling bearing to be applied to the bearing device in accordance with the fourth embodiment.

Herein, in the rolling bearing 30, site stress is generated at a corner portion 37e of the small-diameter step portion 37 of the outer ring 31 due to a thrust force from a gear (refer to FIG. 16). Also, the tensile stress at the corner portion 37e is further increased by a bolt axial force at a phase position at which the attachment hole 43, to which a bolt is to be fastened, is formed.

Therefore, in order to reduce the tensile stress that is to be applied to the corner portion 37e of the small-diameter step portion 37 of the outer ring 31, a contact surface (a region E of a more inner diameter-side than the dotted line shown in FIG. 15 and a dotted line part F of FIG. 16) between the rolling bearing 30 and the retainer plate 40 at the phase position of the attachment hole 43 is preferably secured as wide as possible. Further, based on the phase position of the relief part 48 and the engagement claw 49 spaced from the attachment hole 43, the contact area between the rolling bearing 30 and the retainer plate 40 in the vicinity of the attachment hole 43 at which the tensile stress becomes particularly great is widely secured.

Also, since the shape of the retainer plate 40 and the positions of the attachment holes 43 are determined so as to avoid the interference with other adjacent components, they are different depending on devices of an attachment target. Even if the same rolling bearing is used, an angle (phase) at which the retainer plate 40 is to be mounted and a phase of radial load that is to be applied to the rolling bearing may also be different.

Therefore, in the fourth embodiment, as the positions of the relief part 48 and the engagement claw 49 having versatility and capable of effectively reducing the tensile stress to be applied to the corner portion 37e of the small-diameter step portion 37 of the outer ring 31 at any attachment condition, the relief part 48 and the engagement claw 49 are formed at the circumferentially intermediate phase of the attachment holes 43 adjacent in the circumferential direction.

Meanwhile, in the present invention, the circumferentially intermediate phase of the attachment holes 43 adjacent in the circumferential direction includes a configuration where the above effect is accomplished and an absolute value of the angle difference ($\theta 1-\theta 2$) is equal to or less than 10°. Preferably, the absolute value of the angle difference ($\theta 1-\theta 2$) is set to 5° or less.

Figure 17:
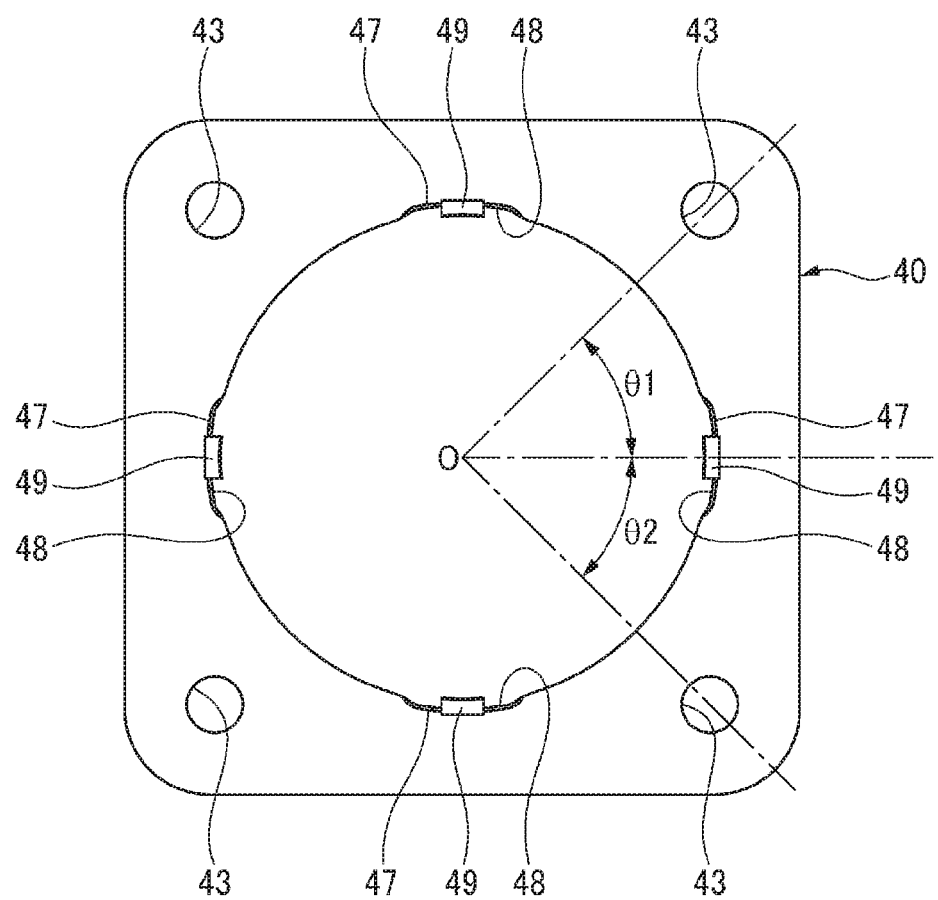
FIG. 17 is a plan view of the backside of the retainer plate to be applied to a bearing device in accordance with a modified embodiment of the fourth embodiment of the present invention.

Also, in the above embodiments, the retainer plate 40 having the three attachment holes 43 equidistantly spaced in the circumferential direction has been described. However, the present invention is not limited thereto. For example, also in the retainer plate 40 having four attachment holes 43 equidistantly spaced in the circumferential direction, as shown in FIG. 17, the relief part 48 and the engagement claw 49 are preferably formed at the circumferentially intermediate phase of the attachment holes 43 adjacent in the circumferential direction, i.e., at the phase at which the absolute value of the angle difference ($\theta-\theta 2$) is equal to or less than 10°, preferably 5° or less, and more preferably $\theta 1=\theta 2$ (FIG. 17).

Figure 18:
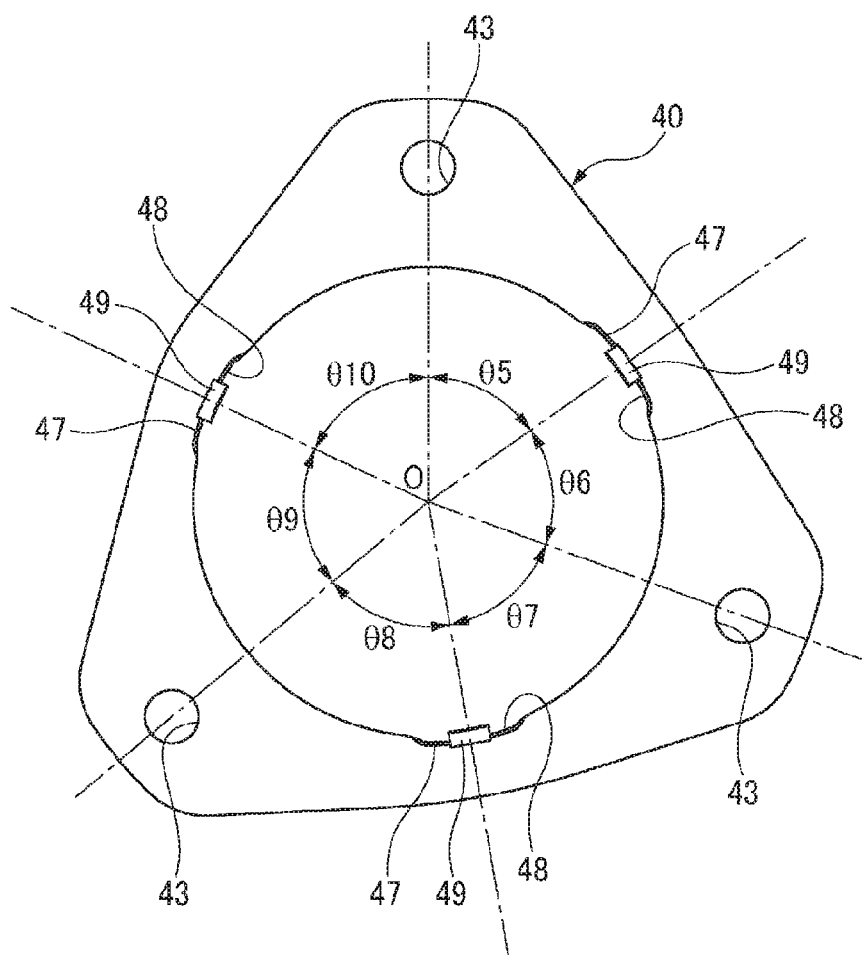
FIG. 18 is a plan view of the backside of the retainer plate to be applied to a bearing device in accordance with another modified embodiment of the fourth embodiment of the present invention.

Also, as shown in FIG. 18, even when angle intervals (i.e., $\theta 5+\theta 6$, $\theta 7+\theta 8$, $\theta 9+\theta 10$) in the circumferential direction of the three attachment holes 43 are respectively different, the relief part 48 and the engagement claw 49 are preferably formed at the circumferentially intermediate phase of the attachment holes 43 adjacent in the circumferential direction, i.e., at the phase at which absolute values of the angle differences ($\theta 5-\theta 6$, $\theta 7-\theta 8$, $\theta 9-\theta 10$) are respectively equal to or less than 10°, preferably 5° or less, and more preferably $\theta 5=\theta 6$, $\theta 7=\theta 8$ and $\theta 9=\theta 10$ (FIG. 18).

The other configurations and operations are the same as the first to third embodiments.

In the meantime, the present invention is not limited to the above embodiments and the modified embodiments, and can be appropriately modified and improved.

For example, in the above embodiments, the tapered parts 47 are formed at the peripheral edge between the inner peripheral surface of the fitting hole 41 and the backside 46 of the retainer plate. However, the present invention is not limited thereto. For example, a thickness reduction part having a shape where a part, which is formed as the inner peripheral surface of the fitting hole 41 and the backside 46 of the retainer plate intersect, is excluded may be used. For example, the thickness reduction part may be a curved surface part 55 having a convex shape shown in FIG. 19, a curved surface part having a concave shape or a step part having a stair shape inasmuch as it is formed by the press working.

Figure 19:
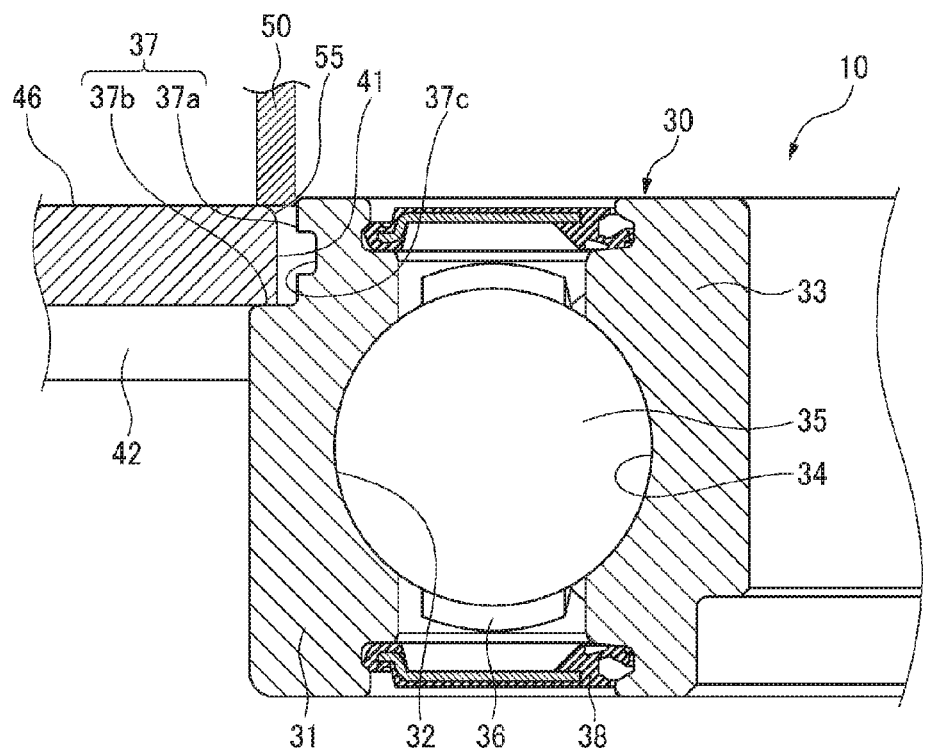
FIG. 19 is a sectional view depicting a state before processing the engagement claws of a bearing device in accordance with a modified embodiment of the present invention.
Figure 20A:
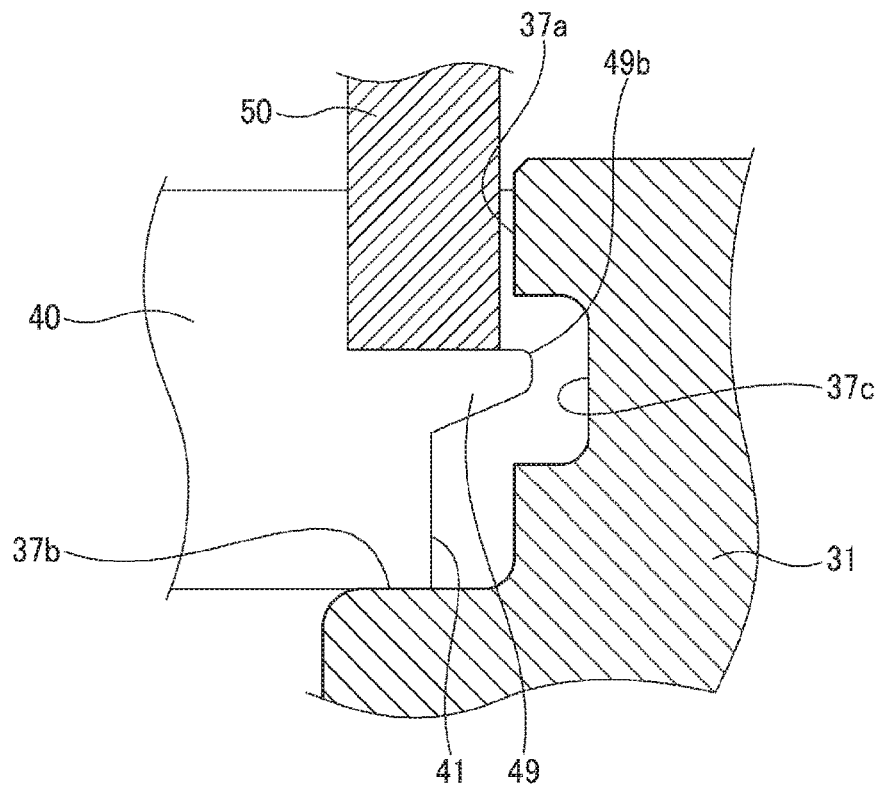
FIG. 20A is a partially sectional view depicting a state where the engagement claws have been formed by the punch.
Figure 20B:
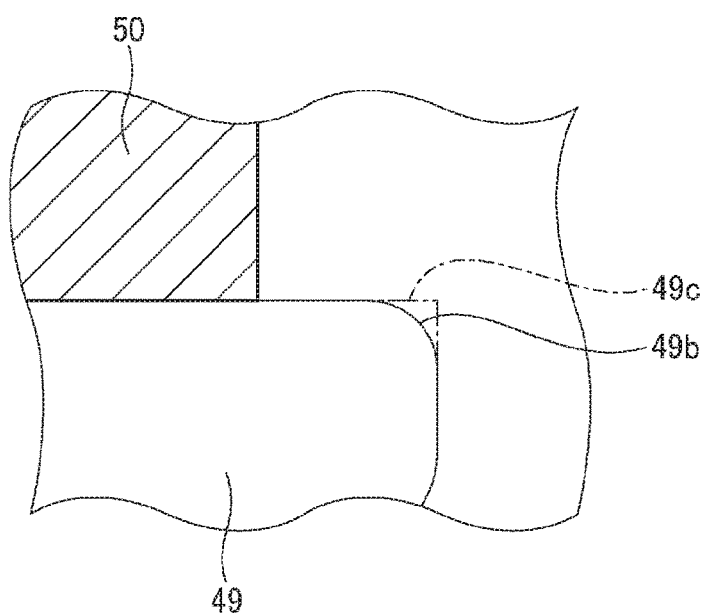
FIG. 20B is an enlarged sectional view of main parts.

In a modified embodiment of FIG. 19, the punch 50 is arranged to extend over both the curved surface part 55 of the fitting hole 41 and the backside 46 of the retainer plate 40 and is configured to axially press the inner periphery of the retainer plate 40 and to crush parts of the inner periphery of the retainer plate 40, including the curved surface part 55, thereby forming the engagement claws 49 to be engaged to the engagement groove 37c, like the above embodiments. At this time, as shown in FIGS. 20A and 20B, the tip portion of the engagement claw 49 becomes a curved portion 49b and is not formed with the corner portion 49c, like the above embodiments. Therefore, it is possible to prevent the damage of the corner portion 49c.

Also, even when the thickness reduction part is the curved surface part 55, the condition of the shapes of the punch 50 and the curved surface part 55 for forming the engagement claw 49 is the same as the condition of the shapes of the punch 50 and the tapered part 47 shown in FIG. 12.

Figure 21:
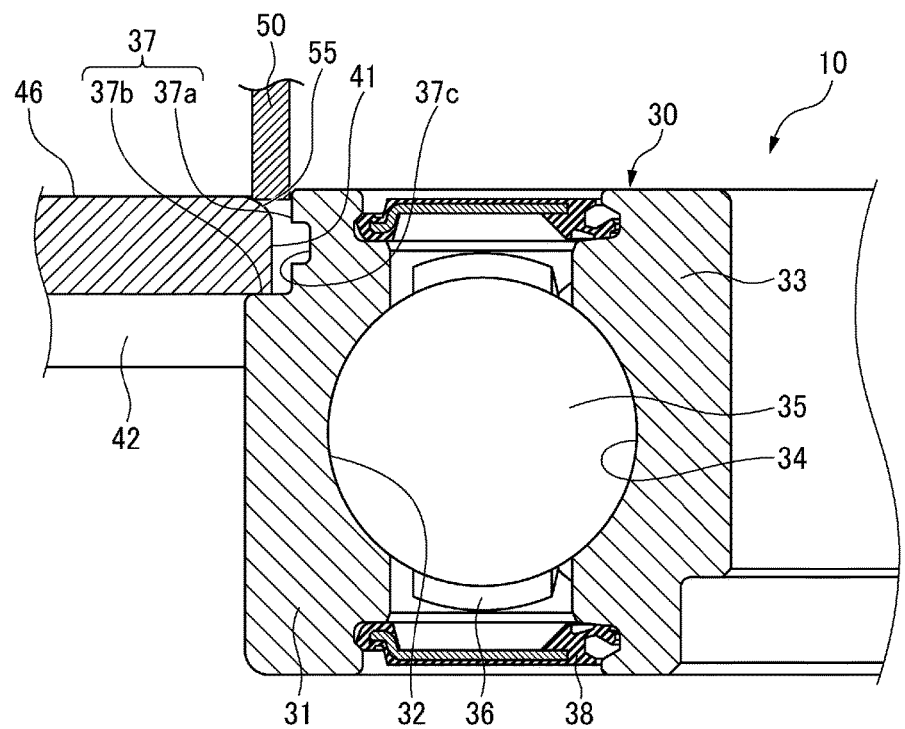
FIG. 21 is a sectional view depicting a state before processing the engagement claws of a bearing device in accordance with another modified embodiment of the present invention.

That is, as shown in FIG. 21, an outer diameter of the curved surface part 55 is made greater than the outer diameter of the punch 50, so that the punch 50 crushes only the curved surface part 55, thereby forming the engagement claw 49.

Also, in the above embodiments, the engagement claws are formed at three places on the inner periphery of the retainer plate. However, the present invention is not limited thereto. For example, the engagement claws may be formed at two places or four or more places on the inner periphery of the retainer plate.

Also, in the above embodiments, the engagement groove is formed on the outer peripheral surface of the small-diameter step portion over the entire circumference. However, the present invention is not limited thereto. For example, a plurality of engagement grooves extending in the circumferential direction at the places, at which the engagement claws are formed, on the outer peripheral surface of the small-diameter step portion may be formed.

Also, in the above embodiments, the thickness reduction part is formed at the relief part of the retainer plate. However, the thickness reduction part may be formed at other place on the entire circumference of the inner periphery the retainer plate inasmuch as the thickness reduction part is formed at the relief part of the retainer plate.

Also, as shown in FIGS. 15, 17 and 18, both circumferential end portions of the relief part (thickness reduction part) 48 and the fitting hole 41 may be made to be continuous by a smooth curved line.

The subject application is based on a Japanese Patent Application No. 2014-122840 filed on Jun. 13, 2014 and a Japanese Patent Application No. 2014-259192 filed on Dec. 22, 2015, which are herein incorporated by reference.

DESCRIPTION OF REFERENCE NUMERALS

10: bearing device
30: rolling bearing
31: outer ring
33: inner ring
35: ball (rolling element)
37: small-diameter step portion
37a: step portion outer peripheral surface
37b: step surface
37c: engagement groove
37d: axially outboard side wall
40: retainer plate
41: fitting hole
44: surface of retainer plate
46: backside of retainer plate (side surface of retainer plate)
47: tapered part (thickness reduction part)
48: relief part
49: engagement claw
50: punch
55: curved surface part

The invention claimed is:

1. A bearing device comprising:
   a rolling bearing having an inner ring, an outer ring having a small-diameter step portion provided on an outer periphery of an axial end portion thereof, and a plurality of rolling elements arranged to be rollable between the inner ring and the outer ring, and a retainer plate having a fitting hole to be fitted to the small-diameter step portion and configured to fix the rolling bearing to a housing, wherein an outer peripheral surface of the small-diameter step portion is formed with an engagement groove extending in a circumferential direction, wherein the retainer plate has a plurality of engagement claws protruding radially inward from an inner periphery of the retainer plate defining the fitting hole and configured to be engaged to the engagement groove, wherein in a state that the fitting hole is fitted to the small-diameter step portion, the engagement claws are formed by axially pressing the inner periphery of the retainer plate, including thickness reduction parts formed in advance at a peripheral edge between an inner peripheral surface of the fitting hole and a side surface of the retainer plate, and plastically deforming the inner periphery of the retainer plate so as to protrude radially inward, and the engagement claws are engaged to the engagement groove, wherein the fitting hole has a plurality of relief parts of which an inner diameter is greater than other part, wherein each of the thickness reduction parts has arc length shorter than an arc length of the relief part and is formed at a peripheral edge between an inner peripheral surface of the relief part and the side surface of the retainer plate, and wherein each of the thickness reduction parts includes a tapered surface formed at the peripheral edge between the inner peripheral surface of each relief part and the side surface of the retainer plate.

2. The bearing device according to claim 1, wherein the retainer plate is formed with at least three attachment holes, into which fastening screws for fixing the bearing device to the housing are to be screwed or inserted, at radially outer sides of the fitting hole, and wherein the engagement claws are respectively provided at a circumferentially intermediate phase of the attachment holes adjacent in the circumferential direction.

3. A method for manufacturing a bearing device comprising a rolling bearing having an inner ring, an outer ring having a small-diameter step portion provided on an outer periphery of an axial end portion thereof, and a plurality of rolling elements arranged to be rollable between the inner ring and the outer ring, and a retainer plate having a fitting hole to be fitted to the small-diameter step portion and configured to fix the rolling bearing to a housing, the method comprising:

forming thickness reduction parts at a peripheral edge between an inner peripheral surface of the fitting hole and a side surface of the retainer plate, and after fitting the small-diameter step portion to the fitting hole, forming engagement claws by axially pressing an inner periphery of the retainer plate defining the fitting hole, including at least the thickness reduction parts, and plastically deforming the inner periphery of the retainer plate so as to protrude radially inward, and engaging the engagement claws to an engagement groove formed on an outer peripheral surface of the small-diameter step portion and extending in a circumferential direction, wherein a step of forming the thickness reduction parts is performed before a step of forming the fitting hole by punching processing.

4. The method for manufacturing the bearing device according to claim 3, wherein the fitting hole is formed with a shear part and a fracture part by the punching processing, in addition to the thickness reduction parts, and wherein a total sum of a cross-section height of the thickness reduction part and an axial length of the shear part is equal to or greater than a total sum of an axial pressing amount of the inner periphery of the retainer plate and a thickness of the engagement claw.

5. The method for manufacturing the bearing device according to claim 3, wherein the fitting hole has a plurality of relief parts of which an inner diameter is greater than other part, and wherein each of the thickness reduction parts has an arc length shorter than an arc length of the relief part and is formed at a peripheral edge between an inner peripheral surface of the relief part and the side surface of the retainer plate.

* * * * *